(12) United States Patent
Karbiner et al.

(10) Patent No.: US 11,274,868 B2
(45) Date of Patent: Mar. 15, 2022

(54) EXPANSION UNIT FOR INSTALLATION IN A REFRIGERANT CIRCUIT

(71) Applicant: BITZER Kuehlmaschinenbau GmbH, Sindelfingen (DE)

(72) Inventors: Julian Karbiner, Leonberg (DE); Oliver Javerschek, Tuebingen (DE); Joerg Nickl, Malter (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 164 days.

(21) Appl. No.: 16/524,874

(22) Filed: Jul. 29, 2019

(65) Prior Publication Data

US 2019/0353414 A1    Nov. 21, 2019

Related U.S. Application Data

(63) Continuation of application No. PCT/EP2017/051943, filed on Jan. 30, 2017.

(51) Int. Cl.
*F25B 40/02* (2006.01)
*F25B 49/02* (2006.01)
(Continued)

(52) U.S. Cl.
CPC ............ *F25B 49/022* (2013.01); *F04B 3/003* (2013.01); *F25B 40/02* (2013.01); *F25B 41/40* (2021.01)

(58) Field of Classification Search
CPC ........ F25B 41/40; F25B 49/022; F25B 40/02; F04B 3/003
See application file for complete search history.

(56) References Cited

U.S. PATENT DOCUMENTS

| 4,896,515 A | 1/1990 | Endou |
| 8,505,317 B2 * | 8/2013 | Ascani ...................... F25B 1/10 |
| | | 62/116 |

(Continued)

FOREIGN PATENT DOCUMENTS

| DE | 10 2006 010 122 | 8/2007 |
| EP | 0 239 680 | 10/1987 |
| WO | 2008/142714 | 11/2008 |

*Primary Examiner* — Elizabeth J Martin
*Assistant Examiner* — Nael N Babaa
(74) *Attorney, Agent, or Firm* — Reinhart Boerner Van Deuren P.C.

(57) ABSTRACT

The invention relates to an expansion unit for installation in a refrigerant circuit, including an expansion system having an subcooling unit for subcooling a mass flow of a refrigerant that is supplied to the expansion unit, having an expansion/compression unit including an expander stage and a compressor stage, having a branching point that splits off a subcooling mass flow from a total mass flow supplied to the expansion unit and that is connected to a supply conduit that guides the subcooling mass flow to an inlet of the subcooling unit, having an expansion member that expands the subcooling mass flow to a subcooling pressure, having a connection conduit that supplies the subcooling mass flow exiting from the subcooling unit to the compression stage, which for its part compresses the subcooling mass flow to a return high pressure, and having an electrically operated controller that detects an ambient temperature and/or a temperature of the mass flow of refrigerant that is supplied to the expansion unit and/or the expander stage, and in accordance with this temperature adjusts an inlet pressure of the expansion unit or the expansion/compression unit by controlling the subcooling mass flow using the expansion member that is electrically controlled by the controller.

55 Claims, 15 Drawing Sheets

(51) Int. Cl.
*F04B 3/00* (2006.01)
*F25B 41/40* (2021.01)

(56) References Cited

U.S. PATENT DOCUMENTS

2010/0162740 A1    7/2010  Ascani
2015/0211772 A1*   7/2015  Shimazu ................ F25B 40/02
                                                  62/196.4

* cited by examiner

EXPANSION UNIT FOR INSTALLATION IN A REFRIGERANT CIRCUIT

CROSS-REFERENCE TO RELATED PATENT APPLICATION

This application is a continuation of International application number No. PCT/EP2017/051943 filed Jan. 30, 2017.

This patent application claims the benefit of International application No. PCT/EP2017/051943 filed Jan. 30, 2017, the teachings and disclosure of which are hereby incorporated in their entirety by reference thereto.

BACKGROUND OF THE INVENTION

The invention relates to an expansion unit for installation in a refrigerant circuit.

Expansion units of this kind are known.

Conventionally, expansion units of this kind are formed by expansion valves or by energy-generating expansion machines.

The object of the invention is to provide a highly energy-efficient expansion unit.

SUMMARY OF THE INVENTION

This object is achieved with an expansion unit for installation in a refrigerant circuit, including an expansion system having an subcooling unit for subcooling a mass flow of a refrigerant that is supplied to the expansion unit, having an expansion/compression unit including an expander stage and a compressor stage, having a branching point that splits off a subcooling mass flow from a total mass flow supplied to the expansion unit and that is connected to a supply conduit that guides the subcooling mass flow to an inlet of the subcooling unit, having an expansion member that is provided in the supply conduit and that expands the subcooling mass flow to a subcooling pressure, having a connection conduit that supplies the subcooling mass flow exiting from the subcooling unit to the compression stage, which for its part compresses the subcooling mass flow to a return high pressure that corresponds at least to a high pressure of the compressor mass flow to which the subcooling mass flow is supplied, and having an electrically operated controller that detects an ambient temperature and/or a temperature of the mass flow of refrigerant that is supplied to the expansion unit and/or the expander stage, and in accordance with this temperature adjusts an inlet pressure of the expansion unit or the expansion/compression unit by controlling the subcooling mass flow using the expansion member that is electrically controlled by the controller.

The advantage of the inventive solution can be seen in the fact that it operates in a highly energy-efficient manner, since there is no throttling member of any kind in the mass flow supplied to the expander stage for the purpose of adjusting the mass flow flowing to the expander stage.

Rather, the mass flow flowing to the expander stage which is relevant to the inlet pressure of the expansion unit or the expansion/compression unit is adjusted exclusively by way of controlling the subcooling mass flow using the expansion member controlled by the controller, with the result that when the mass flow expands in the expander stage maximum energy recovery is achieved, which can be used for compressing the subcooling mass flow in the compressor stage such that consequently, and at the same time, optimum subcooling of the expanded mass flow is in turn achieved before it is expanded.

In particular, for this purpose the expansion member includes an electrically controllable servo motor.

A particularly favourable solution provides for the branching point to be arranged between the subcooling unit and the expansion/compression unit and to split off the subcooling mass flow from the total mass flow downstream of the subcooling unit.

This solution has the advantage, from an energy point of view, that as a result the split-off subcooling mass flow has likewise already been cooled in the subcooling mass unit.

This solution is particularly advantageous if there is subcritical heat removal, and allows more pronounced subcooling.

Further, this solution has the advantage that pulsations of the expansion/compression unit are damped by the supply conduit with the expansion member, leading away from the branching point.

More detailed statements have not yet been made as regards the form taken by the subcooling unit.

Here, the subcooling unit may take various forms.

One solution provides for the subcooling unit to take the form of a heat exchanger unit and to cool the mass flow of refrigerant flowing to the expander stage using the subcooling mass flow guided through the latter in counterflow.

Another advantageous solution provides for the subcooling unit to take the form of a collecting container in which a bath of liquid refrigerant of the subcooling mass flow is formed that cools an element that guides the mass flow of refrigerant flowing to the expander stage through the bath, wherein a volume of gas forms above the bath and the gaseous subcooling mass flow is removed therefrom.

This solution has the advantage that, on the one hand, the mass flow guided through the element is subcooling in optimum manner and, on the other hand, removal of the subcooling mass flow from the gas volume makes it possible to ensure that no liquid refrigerant is supplied to the compressor stage for compression.

The most diverse solutions are conceivable for measuring the temperature of the mass flow of refrigerant.

One solution provides for the controller to use a sensor to measure the ambient temperature and/or the temperature of the mass flow of refrigerant upstream of an inlet to the subcooling unit and/or upstream of entry thereof into the expander stage.

A further solution that detects the temperature of the mass flow of refrigerant in a comprehensive manner provides for the temperature of the mass flow of refrigerant to be measured upstream of entry thereof into the subcooling unit and upstream of entry thereof into the expander stage, by a respective sensor.

A further solution provides for the controller to use a sensor to detect the ambient temperature and to take this into account, by itself or where appropriate in combination with the temperature of the mass flow of refrigerant, upstream of the entry thereof into the subcooling unit and/or upstream of entry thereof into the expander stage for control of the expansion member.

It is particularly advantageous if the controller is an electronic controller that includes a processor and electrically controls the expansion member using a control program, since with a processor the multiplicity of correlations between the measured temperature and the subcooling mass flow to be controlled using the expansion member can be produced in a simple manner.

In particular, when the controller takes this form, it is always possible to control the expansion member such that the subcooling mass flow exits the subcooling unit in the superheated condition, and the possibility that partly liquid refrigerant in the subcooling mass flow exits from the subcooling unit and is supplied to the expansion stage is thus avoided.

For the purpose of monitoring the temperature of the subcooling mass flow exiting from the subcooling unit, in particular a sensor that is connected to the controller is provided in a connection conduit between the subcooling unit and the expander stage.

In the solution described, the control program takes a form in particular such that it includes either an algorithm for determining control of the expansion member, or a stored correlation table that correlates the adjustment of the expansion member with the measured temperature of the supplied mass flow.

More detailed statements have not yet been made as regards connecting the expander stage and the compressor stage.

In principle, the expander stage and the compressor stage could be coupled for example by a generator/motor unit.

However, a particularly advantageous solution provides for the expander stage and the compressor stage of the expansion/compression unit to be coupled in a mechanically functional manner.

A mechanical functional coupling of this kind means that the energy generated in the expander stage is transferred directly to the compressor stage by way of a mechanical connection.

On the other hand, however, this solution also has the advantage that the inventive solution—namely control of the mass flow that is expanded by the expander stage—can be controlled in a simple manner by way of the subcooling mass flow that is compressed by the compressor stage.

In principle, the expander stage and the compressor stage may be formed by suitable types of machines driven in rotation.

A particularly advantageous solution provides for the expander stage and the compressor stage to be formed by a free-piston machine in which at least one free piston is freely movable in a piston chamber.

Preferably here, the expansion/compression unit takes a form such that it has two piston chambers in each of which a free piston is movable.

Further, preferably the free pistons are movable coupled to one another.

In the free-piston machine according to the invention, it is preferably provided for a first free piston in the respective piston chamber to separate a first expansion chamber and a first compression chamber from one another.

Further, it is advantageously provided for a second free piston in the respective piston chamber to separate a second expansion chamber from a second compression chamber.

In order to operate the two free pistons in an advantageous manner, it is preferably provided for the two free pistons to be arranged and movable coaxially with one another in the piston chambers.

Favourably, the first piston chamber is separated from the second piston chamber by a separating body.

It is then possible to operate the expansion/compression unit advantageously if the two expansion chambers are arranged in the piston chambers adjacent to the separating body.

Further, it is preferably provided for the two compression chambers to be arranged on the opposite sides of the respective free pistons to the expansion chambers.

In principle, the free pistons may operate independently of one another.

However, an advantageous solution provides for a coupling element that couples the free pistons to extend through the separating body and to be movable, in particular in sealed manner, relative thereto.

In the simplest case, the coupling element takes a form here such that it extends through each of the expansion chambers as far as the respective free piston.

As regards the incoming flow of refrigerant to the expansion chambers, it is preferably provided for it to be controllable by a slider system.

A slider system of this kind takes the form for example of a switching slider such that in one slider position the refrigerant flows into one expansion chamber and out of the other expansion chamber, and in the other slider position the refrigerant flows into the other expansion chamber and out of the one expansion chamber.

For the purpose of controlling the slider system, it is preferably provided for the slider system to be controllable by a slider drive by means of which the two slider positions are adoptable.

A slider drive of this kind may be implemented by an electrical controller that detects at least one position of the free pistons using at least one position sensor that is associated with these free pistons.

As an alternative thereto, an advantageous solution provides for the slider drive to be controllable by a difference in pressure between an expander inlet and an expander outlet.

Preferably here, the slider drive takes the form of a double-acting actuating cylinder, the piston of which is acted upon on one side by the pressure at the expander inlet and on the other by the pressure at the expander outlet.

For the purpose of controlling a drive unit of this kind, it is favourably provided for the slider drive to be controllable by a control slider that controls the action on the piston by the pressure on one side at the expander inlet and on the other at the expander outlet.

Preferably, the control slider takes a form such that it detects the positions of the free pistons and moves in accordance with these.

In particular, it is provided for the control slider to be movable by the free pistons.

In order to be able to deliver the expansion unit according to the invention preferably as a single, fully assembled unit and to install it in a refrigerant circuit, it is preferably provided for the expansion unit to have a device base on which the subcooling unit and the expansion/compression unit are arranged.

Further, it is favourable if the control unit is also arranged on the device base.

Moreover, it is advantageous for installation if a high-pressure inlet connector and an expansion-pressure outlet connector are arranged on the device base.

Further, in an advantageous solution it is provided for there to be arranged on the device base a high-pressure outlet connector by way of which the compressed subcooling mass flow flows away when the expansion unit is installed.

A further advantageous solution provides for heat exchanger connector units to be provided on the device base, and a plurality of heat exchangers on the high-pressure side can be connected thereto.

In particular in this case, each of the heat exchanger connector units takes a form such that it has a respective three-way valve and a respective bypass for the respective heat exchanger such that the three-way valve provides the possibility of controlling flow through the respective heat exchanger.

In particular in this case, it is provided for at least one of the heat exchanger connector units to be connected to a heat exchanger on the high-pressure side that emits heat to the ambient air.

A further advantageous embodiment of an expansion unit provides for the expansion unit to have an expansion system having a first volume ratio defined by the quotient of the volume of the compression chambers to the volume of the expansion chambers, and for there to be connected in parallel with the first expansion system a second expansion system, the volume ratio of which is different from that of the first expansion system.

An expansion unit of this kind has the advantage that the two expansion systems of different volume ratios provide the possibility of adapting expansion of the refrigerant to the respective operating conditions in an optimum manner.

It is particularly advantageous if the expansion systems are operated such that one of the expansion systems operates in the transcritical range and the other expansion system operates in the subcritical range.

Advantageously, in this case the expansion system having the larger volume ratio operates in the transcritical range and the expansion system having the smaller volume ratio operates in the subcritical range.

In order to allow the expansion systems to operate in a correlated manner, it is preferably provided for the controllers of the expansion systems to be coupled to one another.

As an alternative to providing two expansion systems in an expansion unit, it is preferably provided for the expansion unit to include two expansion/compression units, of which one has a first volume ratio defined by the quotient of the volume of the expansion chambers to the volume of the compression chambers and the other has a second volume ratio that differs from the first volume ratio.

In this case too, the expansion unit having two expansion/compression units of different volume ratios provides the possibility of adapting to the different operating conditions in an optimum manner.

In an expansion unit of this kind having two expansion/compression units, it is preferably provided for only one subcooling unit to be present, and for the subcooling mass flow downstream of the one subcooling unit to be supplied either to the one expansion/compression unit or to the other expansion/compression unit or where appropriate to both expansion/compression units.

Preferably in the case of these two expansion/compression units of this kind, it is provided for the volume ratio of the first expansion/compression unit to be larger than the volume ratio of the second expansion/compression unit.

In particular here, the first expansion/compression unit operates in the transcritical range and the second expansion/compression unit operates in the subcritical range.

In particular here, it is provided for the controller to be able to establish whether the first expansion/compression unit or the second expansion/compression unit is being used and where appropriate, if both expansion/compression units are being used, to control division of the expansion mass flow into the partial mass flows that flow to the respective expander stages between the expansion/compression units.

Control of the distribution of the expansion mass flow E to the first or the second expansion/compression unit, or the division thereof between the expansion/compression units, may either be performed by controlling the subcooling mass flows by corresponding control members, or by directly controlling the mass flow to be expanded by way of corresponding control members.

Furthermore, the invention relates to a refrigerant circuit, including a refrigerant compressor unit, a heat exchanger that emits heat and is arranged in the refrigerant circuit on the pressure side of the refrigerant compressor unit, an expansion unit and a cooling stage having at least one heat-absorbing heat exchanger, wherein according to the invention the expansion unit takes a form according to one or more of the features described above.

In principle, it is conceivable for the cooling stage to be operated without its own expansion member, and to operate in the cooling stage using the mass flow expanded by the expansion unit.

In this case, it is favourable if there is arranged downstream of the cooling stage a phase separator, the gas phase of which is supplied to the refrigerant compressor by a suction-pressure conduit.

A phase separator of this kind has the advantage that it prevents liquid refrigerant from being supplied to the refrigerant compressor for compression.

Another advantageous solution provides for the cooling stage to have at least one expansion member, with the result that this provides the possibility of establishing the pressure desired in the cooling stage.

A further advantageous variant of a refrigerant circuit according to the invention provides for there to be arranged between the expansion unit and the cooling stage an intermediate pressure collector, in the bath of which a liquid phase of the refrigerant collects, and in the gas volume of which above the bath a gas phase of the refrigerant collects.

With this solution, preferably the liquid phase is supplied to the cooling stage for expansion in the expansion member thereof.

In this case, the intermediate pressure collector has the advantage that an additional subcooling is also achievable by the intermediate pressure collector as a result of the intermediate pressure of the refrigerant.

In the case of an intermediate pressure collector, it is preferably provided for an additional mass flow to be removed from the gas volume of the intermediate pressure collector.

An additional mass flow of this kind can be supplied to the suction-pressure conduit in particular by way of an expansion member.

Another advantageous solution provides for the additional mass flow that is expanded by the expansion member to cool a main mass flow, which is guided to the cooling stage, in a heat exchanger in order to achieve additional subcooling in the main mass flow.

A further advantageous variant of the refrigerant circuit according to the invention provides for a freezing stage to be connected in parallel with the cooling stage.

In the case of a freezing stage, it is favourably provided for a freezing mass flow that is supplied to the freezing stage to be cooled before expansion in an expansion member associated with the freezing stage, by the mass flow that is expanded in the freezing stage, using a heat exchanger.

A further advantageous variant of a refrigerant circuit according to the invention provides for the total mass flow that is cooled by the heat-emitting heat exchanger to be cooled by the additional mass flow that is expanded by the expansion member, using a heat exchanger.

A further advantageous variant of a refrigerant circuit according to the invention provides for there to be arranged downstream of the expansion unit a heat exchanger in which a heat exchanger medium of a refrigeration system is cooled by the expansion mass flow.

Further features and advantages of the invention form the subject matter of the description below and the representation in the drawing of some exemplary embodiments.

DETAILED DESCRIPTION OF THE INVENTION

Figure 1:
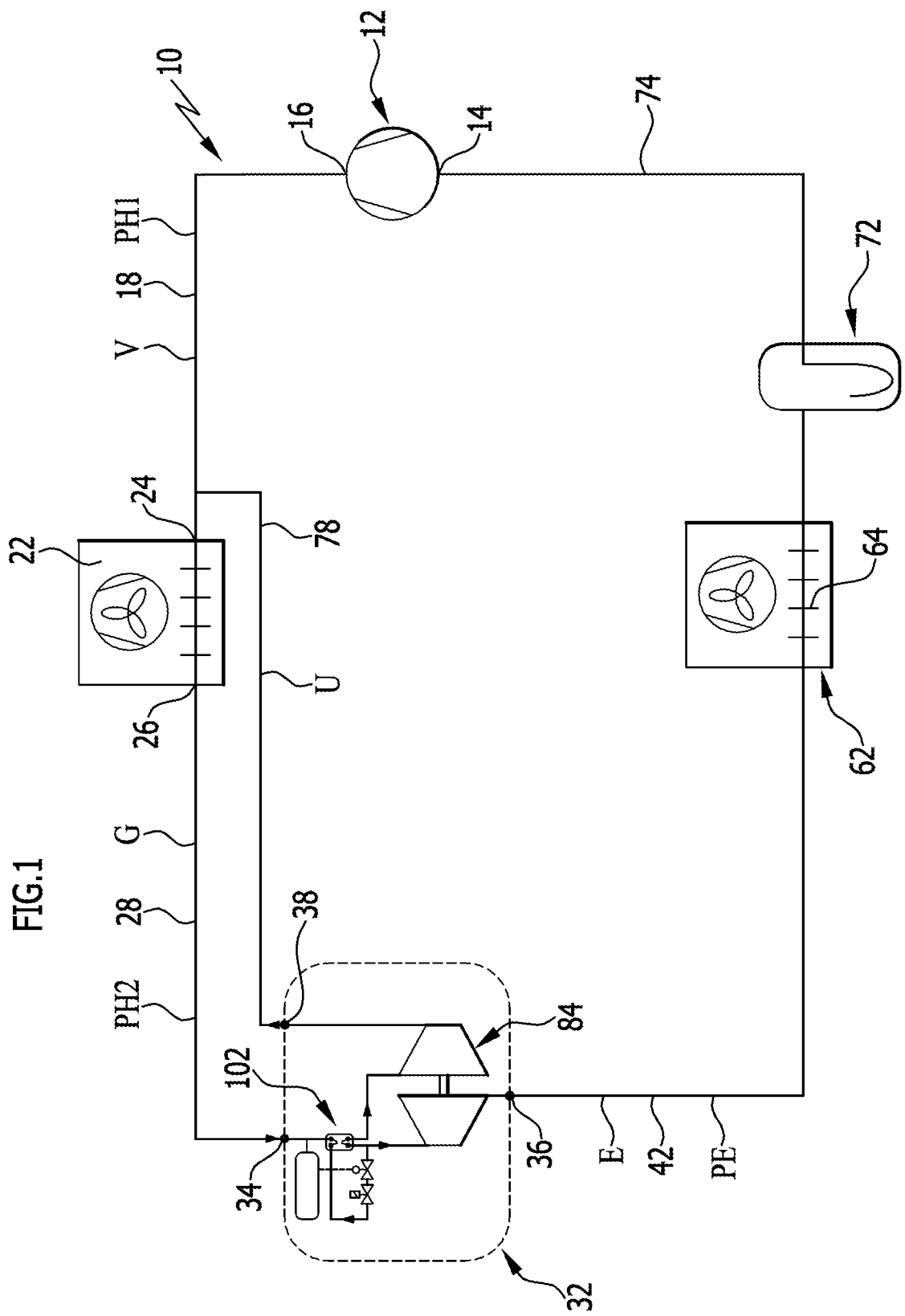
FIG. 1 shows a schematic illustration of a first exemplary embodiment of a refrigerant circuit according to the invention.

A first exemplary embodiment of a refrigeration system according to the invention, illustrated in FIG. 1, includes a refrigerant circuit that is designated 10 as a whole and in which there is arranged a refrigerant compressor unit, which is designated 12 as a whole and includes for example at least one refrigerant compressor.

The refrigerant compressor unit 12 has a suction connector 14 and a pressure connector 16, wherein refrigerant compressed to a high pressure PH1 is usually present at the pressure connector 16.

The term "refrigerant compressed to a high pressure" should be understood here to mean that the refrigerant is at the maximum pressure present in the refrigerant circuit.

From the pressure connector 16, a high-pressure conduit 18 guides a compressor mass flow V, compressed to a high pressure PH1 by the refrigerant compressor unit 12, to an inlet 24 of a heat-emitting heat exchanger on the high-pressure side that is designated 22 as a whole and that emits heat in particular to the ambient air and thus cools the refrigerant, with the result that there is present at an outlet 26 of the heat exchanger 22 on the high-pressure side a total mass flow G of refrigerant that has been cooled by the heat exchanger 22 on the high-pressure side, and this total mass flow G is supplied by a high-pressure discharge conduit 28, which guides refrigerant at a high pressure PH2 that is slightly lower than the high pressure PH1 as a result of the heat exchanger 22, to a first exemplary embodiment of an expansion unit 32 designated 32 as a whole, which regulates high pressure and has a high-pressure inlet connector 34 connected to the high-pressure discharge conduit 28, an expansion-pressure outlet connector 36 and a high-pressure outlet connector 38.

Here, the expansion-pressure outlet connector 36, which is at expansion pressure PE, is connected to an expansion conduit 42 that, in the case of the simplest exemplary embodiment illustrated in FIG. 1, leads to a cooling stage 62, which in the simplest case has a heat exchanger 64 that absorbs heat for the purpose of cooling.

In this simplified exemplary embodiment, the heat-absorbing heat exchanger 64 is at the expansion pressure PE, so there is no separate expansion valve upstream of this heat exchanger 64.

For the purpose of protecting the refrigerant compressor unit 12, there is arranged downstream of the heat-absorbing heat exchanger 64 a phase separator 72 that is arranged in a suction-pressure conduit 74, which leads from the cooling stage 62 to the suction connector 14 of the refrigerant compressor unit 12 and prevents the refrigerant compressor unit 12 from drawing in liquid refrigerant by suction through the suction connector 14.

From the expansion-pressure outlet connector 36, an expansion mass flow E thus flows through the expansion conduit 42 to the cooling stage 62 and from the cooling stage 62 in turn through the suction-pressure conduit 74 to the refrigerant compressor unit 12.

Here, the expansion mass flow E does not correspond to the total mass flow but is reduced by a subcooling mass flow U, which is discharged from the expansion unit 32 at the high-pressure outlet connector 38 at a return pressure PR and is supplied to the compressor mass flow V, upstream of the entry thereof into the heat-emitting heat exchanger 22 on the high-pressure side.

Preferably, the refrigerant circuits 10 according to the invention, which are described below, are all intended for carbon dioxide, that is to say $CO_2$, with the result that in conventional ambient conditions a transcritical circulation procedure is usually present, in which, only before expansion of the refrigerant is carried out by the expansion unit 32, for example using the heat exchanger 22, the refrigerant is cooled to a temperature that corresponds to isotherms lying above the condensation and boiling point curve, or saturation curve, with the result that no liquefying of the refrigerant takes place.

Only in the case of very low temperatures for cooling the heat-emitting heat exchanger on the high-pressure side is there any possibility of performing a subcritical circulation procedure, such that in this case condensation of the refrigerant occurs at a temperature corresponding to an isotherms passing through the condensation and boiling point curve, or saturation curve, of the refrigerant.

Figure 2:
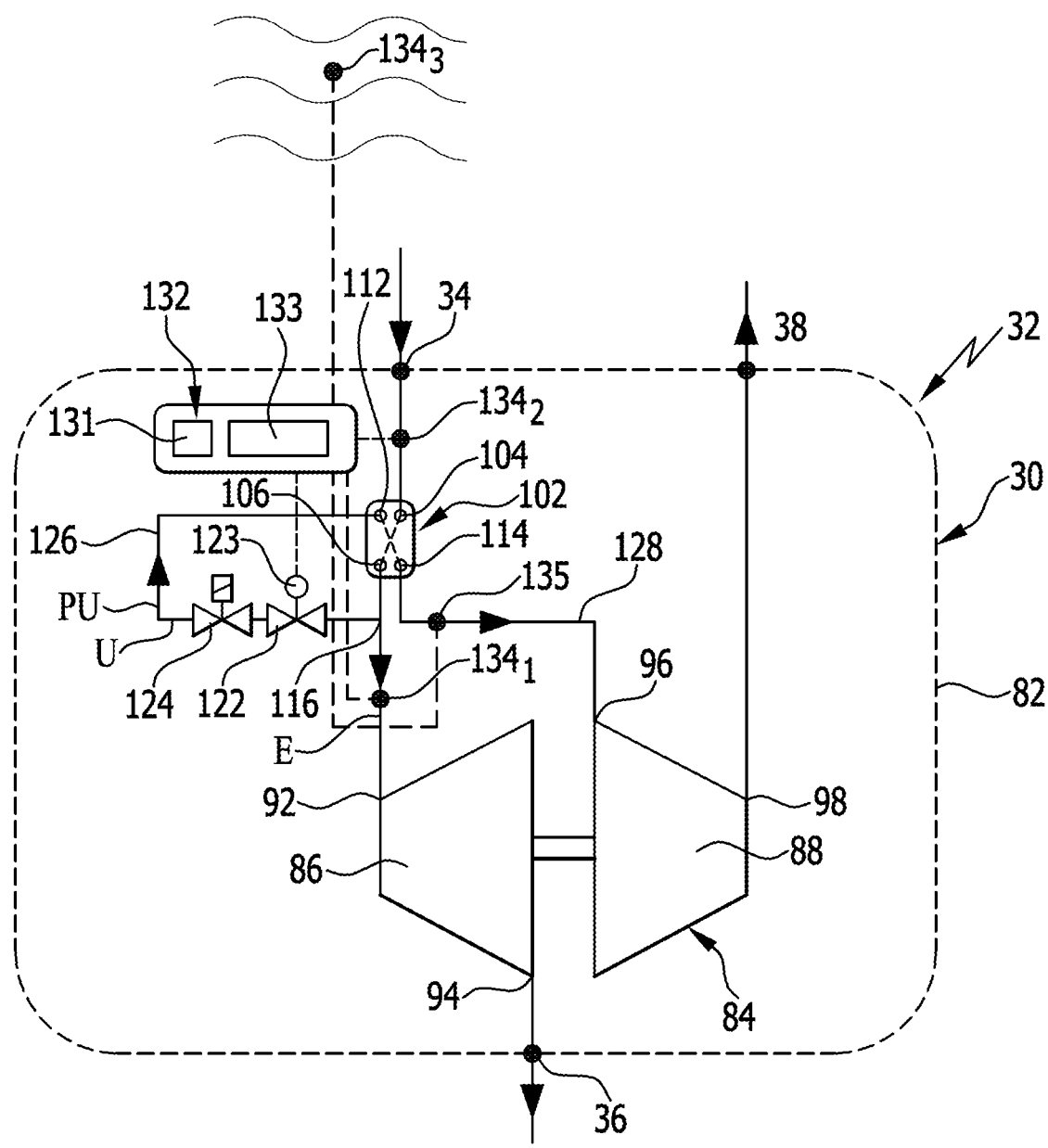
FIG. 2 shows a schematic illustration of a first exemplary embodiment of an expansion unit according to the invention.

The first exemplary embodiment of the expansion unit 32 that takes a form according to the invention includes—as illustrated in FIG. 2—an expansion system 30, which includes a device base that is designated 82 as a whole, on which the high-pressure inlet connector 34, the expansion-pressure outlet connector 36 and the high-pressure outlet connector 38 are arranged.

Further, in the expansion system 30 there is connected to the device base 82 an expansion/compression unit 84, which includes an expander 86 and a compressor 88, which are integrated in the expansion/compression unit 84 and rigidly coupled to one another.

The expansion/compression unit 84 includes an expander inlet 92, an expander outlet 94 connected to the expansion-pressure outlet connector 36, and a compressor inlet 96 and a compressor outlet 98 which, for its part, is in turn connected to the high-pressure outlet connector 38.

Further, in the expansion system 30 there is arranged on the device base 82 an subcooling unit 102, which in the first exemplary embodiment takes the form of a counterflow heat exchanger and has an inlet 104 and an outlet 106 for the mass flow to be cooled, in particular in this case the total mass flow, and an inlet 112 and an outlet 114 for the subcooling mass flow U that is guided through the heat exchanger as a counterflow.

In the expansion system 30, at a branching point 116 the subcooling mass flow U is split off from the subcooling total mass flow G that exits at the outlet 106 of the subcooling unit 102, with the result that an expansion mass flow E is guided from the branching point 116 through a supply conduit to the expander inlet 92, and the subcooling mass flow U is guided in the supply conduit 126 through a shut-off member 124 and an expansion member 122, which is driven by a servo motor 123 and in which the subcooling mass flow U is expanded to a pressure PU and then supplied to the inlet 112 of the subcooling unit 102, wherein the subcooling mass flow U, in counterflow in the subcooling unit 102, subcools the total mass flow G flowing from the inlet 104 to the outlet 106, and is supplied from the outlet 114 to the compressor inlet 96 by means of a connection conduit 128.

The mechanical energy that is released in the expander stage 86 by expansion of the expansion mass flow E is supplied within the expansion/compression unit 84 directly to the compressor stage 88, and results therein in compression of the subcooling mass flow U to a return high pressure PR that corresponds to or is higher than the pressure level PH1 in the high-pressure conduit 18, with the result that the subcooling mass flow U may be supplied from the high-pressure outlet connector 38 over a high-pressure return conduit 78 to the compressor mass flow V.

Further, there is additionally integrated in the expansion system 30 a controller 132 that on the one hand uses a sensor 134, which is in particular a temperature sensor, to detect the temperature of the mass flow of refrigerant before the expansion thereof in the expansion stage 86, and controls the expansion member 122 in accordance with this temperature.

For this purpose, the sensor 134 is arranged for example between the branching point 116 and the expansion stage 86, as sensor 1341.

As an alternative or in addition thereto, however, the sensor 134 is also usable between the high-pressure inlet connector 34 and the subcooling unit 102, as sensor 1342.

As an alternative or in addition, it is provided in particular for the sensor 134, as sensor 1343, to measure the ambient temperature, which in particular as a result of the ambient air flowing through the heat exchanger 22 has a relevant effect on the temperature of the mass flow of refrigerant at the outlet 26 of the heat exchanger 22.

In this context, the expansion member 122 serves to control the subcooling mass flow U and hence to provide closed-loop control of the high pressure PH2 at the high-pressure inlet connector 34 and thus also the high pressure PH2 in the high-pressure discharge conduit 28 in accordance with a relationship previously specified to the controller 132, in particular stored therein as a file or algorithm, in dependence on the temperature of the refrigerant at the sensor 134 and thus in dependence on the possible ways of cooling the refrigerant at high pressure PH2, for example in dependence on the ambient temperature prevailing in the heat exchanger 22 for cooling.

The controller 132 includes in particular a processor 133 and a memory 131 in which an algorithm or a correlation table are stored, as a result of which a correlation between the settings of the expansion member 122 and temperatures measured by the sensor 134 is stored, with the result that the adjustments of the expansion member 122 brought about by the servo motor 123, which is controlled by the controller 132, have the result that the high pressure PH2 that corresponds to the temperature is adjusted at the high-pressure inlet connector 34 and/or at the inlet 104 of the subcooling mass flow 102 and/or at the expander inlet 92.

Closed-loop control of the high pressure PH2 by controlling the subcooling mass flow U is possible because, as a result of the mechanical functional coupling of the expander 86 to the compressor 88, the expansion mass flow E is directly correlated to the subcooling mass flow U at a fixed volume ratio, so the expansion mass flow E is predeterminable by predefining the subcooling mass flow U. Usually, the subcooling mass flow U is approximately 15% to 35% of the total mass flow G, so the expansion mass flow E is approximately 85% to 65% of the total mass flow G.

In particular, closed-loop control of the high pressure PH2 is such that in the subcooling unit 102 the temperature of the total mass flow G on the hot side—that is to say at the inlet 104—is only a few kelvins, for example less than 4 kelvins, or preferably less than 3 kelvins, in particular one to two kelvins, above the temperature of the subcooling mass flow U at the outlet 114 of the subcooling unit 102, in order to substantially completely evaporate the refrigerant in the subcooling mass flow U.

So that where appropriate the temperature of the subcooling mass flow U at the outlet 114 can be reliably monitored, in particular a sensor 135 that is connected to the controller 132 is also provided in the connection conduit 128.

By arranging the controller 132, the expansion member 122, the subcooling unit 102 and the expansion/compression unit 84 on the device base 82, it forms an overall unit that is configured to be assembled in a stand-alone arrangement in the refrigerant circuit 10 and, as a result of closed-loop control of the high pressure that prevails on the outlet side of the heat-emitting heat exchanger 22, provides closed-loop control of the operating conditions of the refrigerant circuit 10.

Figure 3:
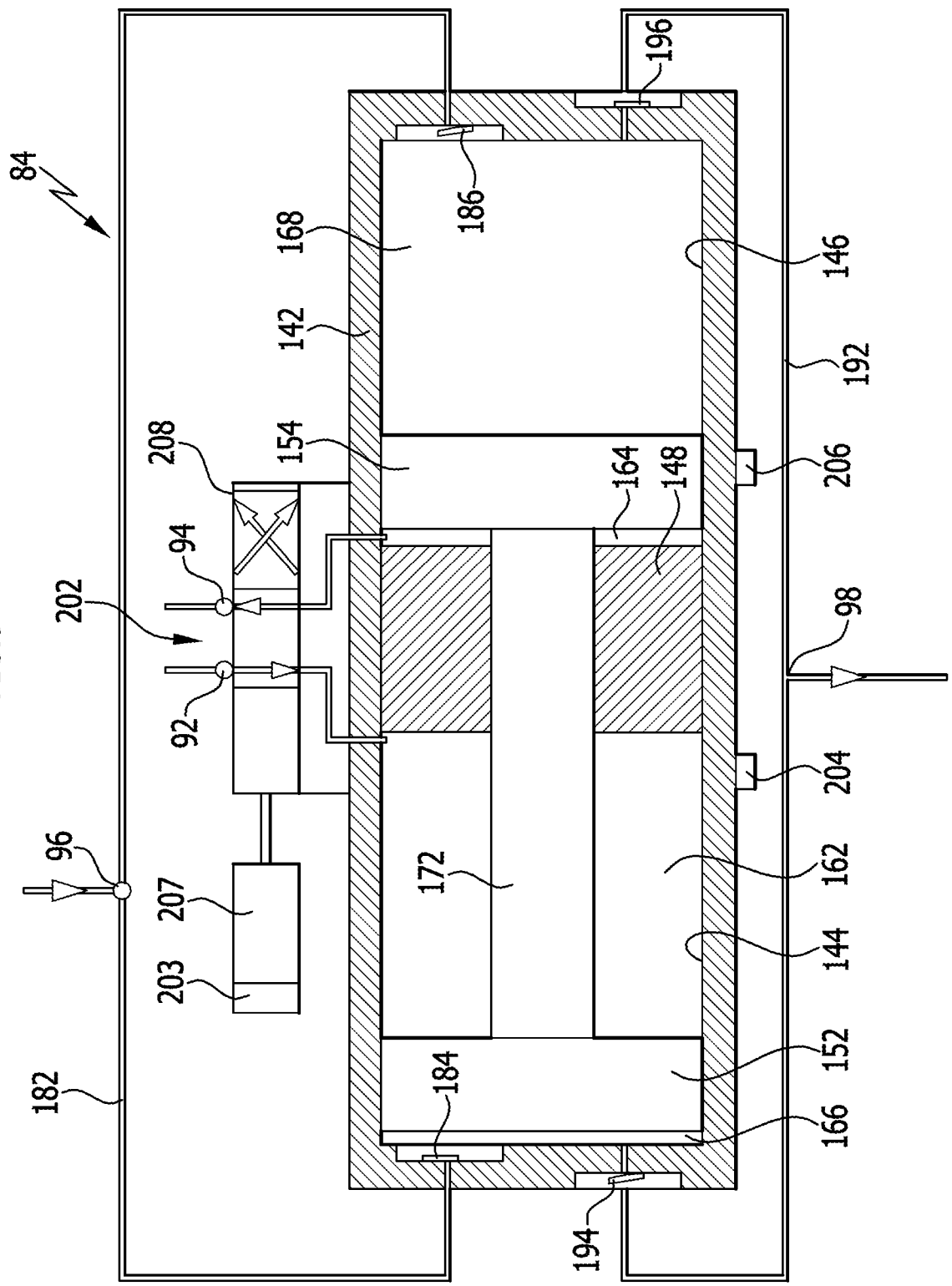
FIG. 3 shows a schematic illustration of a first exemplary embodiment of an expansion/compression unit according to the invention.

As illustrated in FIG. 3, the expansion/compression unit that is designated 84 as a whole takes the form of a free-piston machine that has a cylinder housing 142 in which there are arranged two mutually separated piston chambers 144 and 146, with a movable free piston 152, 154 arranged in each piston chamber.

Here, the free pistons 152 and 154 divide the respective piston chambers 144 and 146 into expansion chambers 162 and 164 and compression chambers 166 and 168.

Further, the free pistons 152 and 154 are preferably mechanically coupled to one another such that when the first expansion chamber 162 is at its maximum volume the first piston 152 is located such that the first compression chamber 166 has its minimum volume and at the same time the second free piston 154 is located such that its expansion chamber 164 has its minimum volume while the compression chamber 168 has its maximum volume, or vice versa.

In this way, for example an increase in volume of the first expansion chamber 162, when it is acted upon by the high pressure at the expander inlet 92, results in a compression of refrigerant of the subcooling mass flow U in the first compression chamber 166, and at the same time in pushing out the refrigerant in the second compression chamber 168 in the direction of the expander outlet 94 and drawing refrigerant in by suction in the second compression chamber 168 through the compressor inlet 96.

Conversely, acting on the second expansion chamber 164 with refrigerant at high pressure that is supplied by way of the expander inlet 92 results in a compression of refrigerant in the second compression chamber 168 and thus in pushing it out to the compressor outlet 98, while at the same time the refrigerant in the first expansion chamber 162 is pushed out in the direction of the expander outlet 94 and refrigerant is drawn in by suction in the first compression chamber 166 through the compressor inlet 96.

Preferably here, the first free piston 152 and the second free piston 154 are arranged coaxially with one another and move in likewise mutually coaxial piston chambers 144 and 146 that are separated from one another by a separating body 148, wherein there passes through the separating body 148 in sealed manner a coupling element 172 that couples movement of the two free pistons 152 and 154.

Here, in the simplest case the coupling element 172 may take the form of a coupling rod that passes through the separating body 148 and moves with the free pistons 152, 154 and abuts freely against each of the free pistons 152 and 154, that is to say is not fixedly connected thereto.

Because, as refrigerant flows in through the expander inlet 92, the pressure in this expansion chamber 162 or 164 acts on the respective free piston 152 or 154, and at the same time there acts in the respective compression chamber 168 or 166 of the respectively other free piston 154 or 152 a pressure that is higher than the pressure at the expander outlet 94 prevailing in the respective expansion chamber 164 or 162, it is possible to generate in the compression chamber 166 or 168 acted upon by the free piston 152 or 154 a pressure that is higher than the high pressure applying at the expander inlet 92, with the result that the subcooling mass flow U can be compressed to a pressure applying at the compressor outlet 98, which corresponds at least to the high pressure PH1 at the inlet 24 of the heat-emitting heat exchanger or the pressure in the high-pressure conduit 18 even though the high pressure PH2 available to the expander inlet is somewhat lower than the high pressure PH1 because of pressure losses in the heat exchanger 22.

For the purpose of connecting the compression chambers 166 and 168 to the compressor inlet 96, there are provided supply conduits 182 from the compressor inlet 96 that lead to inlet valves 184 and 186 associated with the compression chambers 166 and 168, and moreover the compressor outlet 98 is connected to a pressure conduit 192 that leads from outlet valves 194 and 196 associated with the compression chambers 166 or 168 to the compressor outlet 98.

An alternating connection between the expander inlet 92 and the expander outlet 94 and the expansion chambers 162 and 164 is made by way of a slider system 202 that is controlled by the piston position.

For example, the slider system 202 includes a controller 203 that uses position sensors 204 and 206 to detect the positions of the free pistons 152 and 154 and, by means of an electric drive 207, controls a switching slider that is designated 208 as a whole and has two slider positions, and in the one slider position connects the expander inlet 92 to the expansion chamber 162 and the expander outlet 94 to the expansion chamber 164, and in the other slider position connects the expander inlet to the expansion chamber 164 and the expander outlet 94 to the expansion chamber 162.

Figure 4:
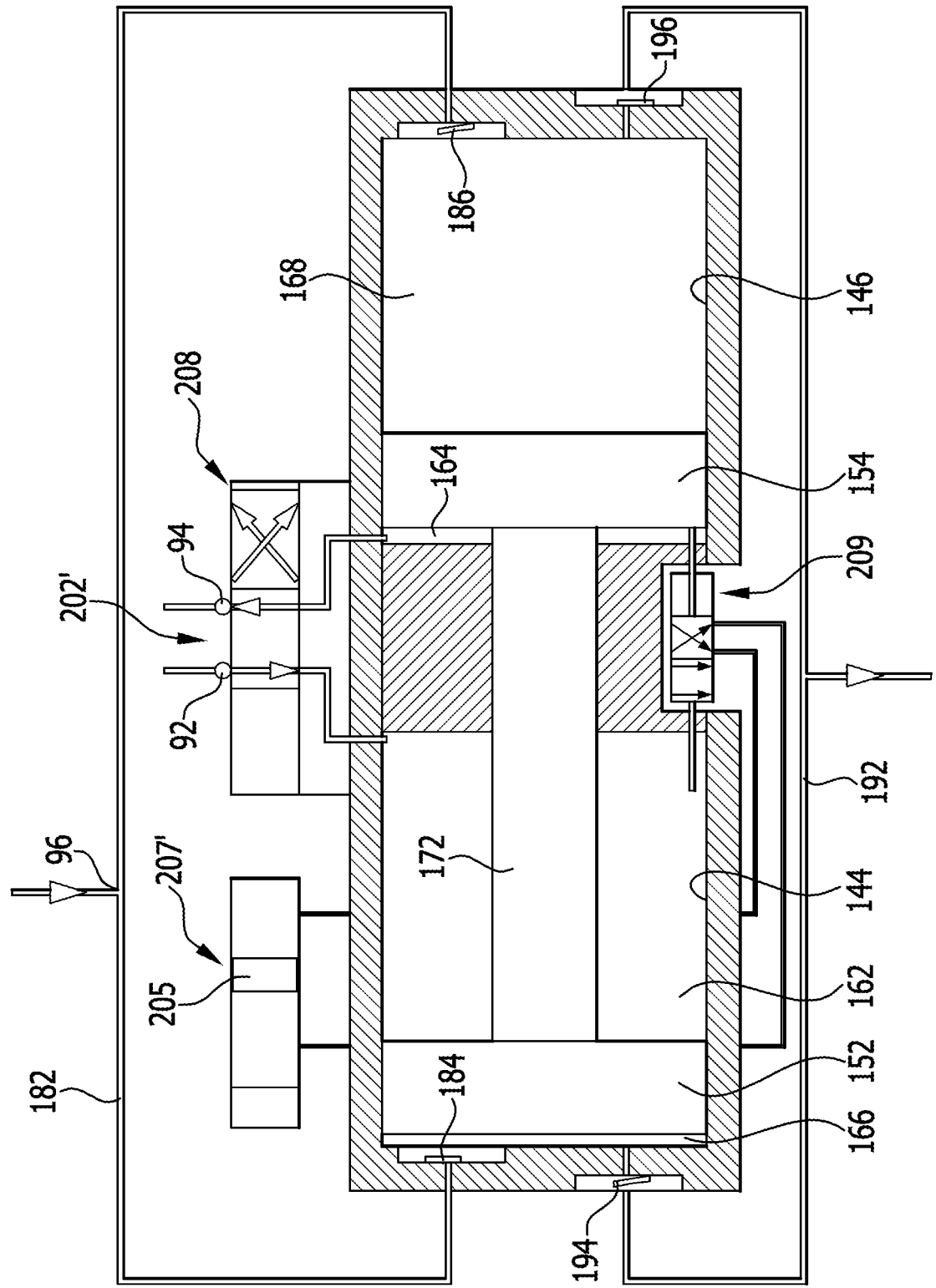
FIG. 4 shows a schematic illustration, similar to FIG. 3, of a second exemplary embodiment of an expansion/compression unit according to the invention.

As an alternative thereto, as illustrated in FIG. 4, there is provided in a slider system 202' a pressure control of the switching slider 208, wherein the drive 207' has a pressure-driven cylinder with a piston 205, and this is acted upon alternately in a controlled manner by an auxiliary slider 209, on the one hand by the pressure at the expander inlet 92 and on the other by the pressure at the expander outlet 94 or vice versa, wherein the auxiliary slider 209 likewise takes the form of a switching slider and the slider positions thereof are adopted as a result of mechanically detecting the positions of the free pistons 152 and 154 in their end positions facing the separating body 148.

Figure 5:
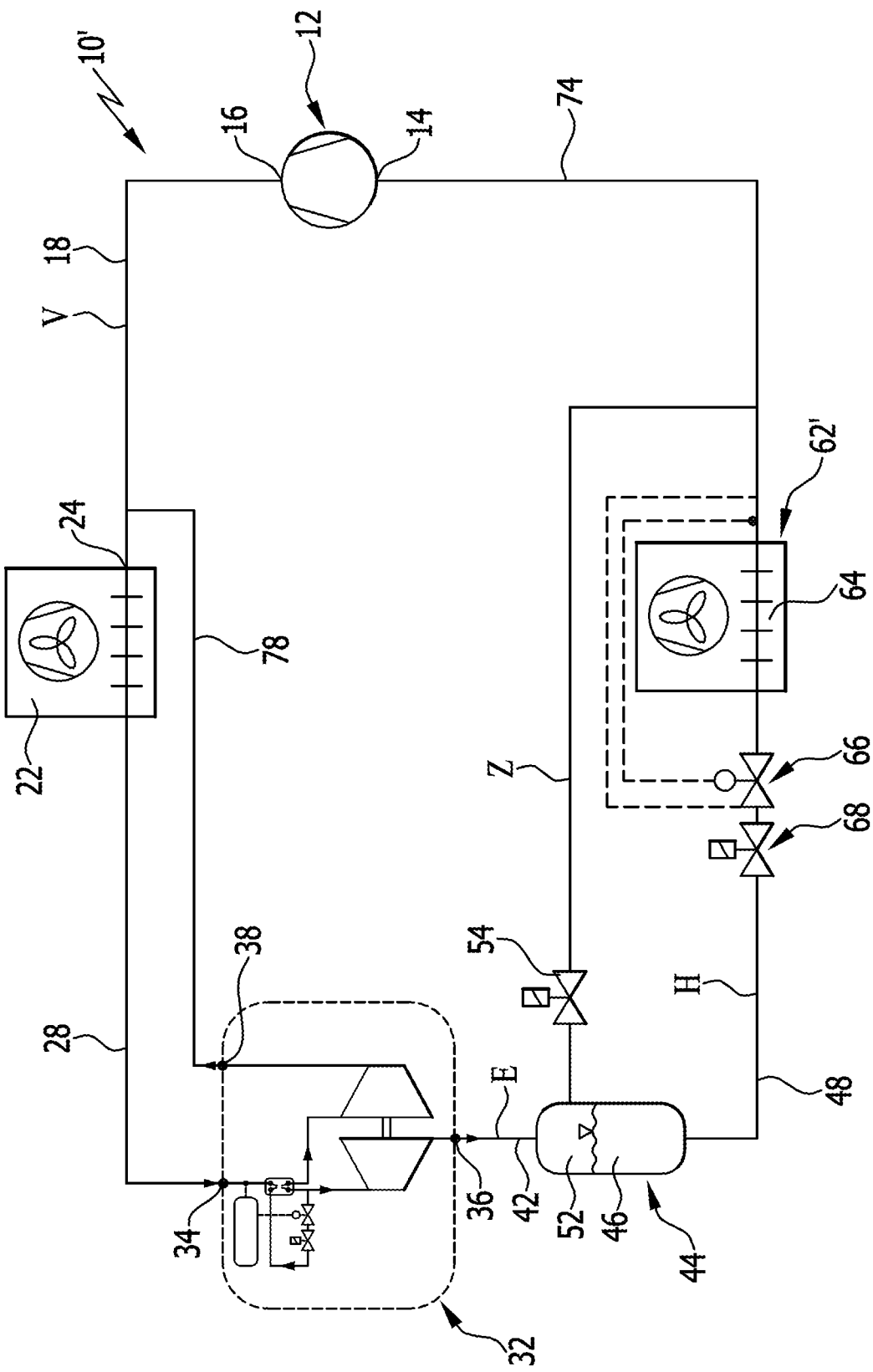
FIG. 5 shows a schematic illustration of a second exemplary embodiment of a refrigerant circuit according to the invention.

In a second exemplary embodiment of a refrigerant circuit 10' according to the invention, which is illustrated in FIG. 5, the elements that are identical to those of the first exemplary embodiment are provided with the same reference numerals, so for a description thereof the reader may be referred to the entire content of the statements relating to these in the context of the first exemplary embodiment.

In contrast to the first exemplary embodiment, in the second exemplary embodiment the expansion conduit 42 does not lead directly to the cooling stage 62 but to an intermediate pressure collector 44 in which there forms a bath 46 of liquid refrigerant at the expansion pressure PE, from which liquid refrigerant is supplied by way of a liquid conduit 48 to the cooling stage 62', which in this case includes not only the heat-absorbing heat exchanger 64 but in addition a switch-off member 68 and an expansion member 66.

Further, there is formed above the bath 46 a gas volume 52, from which an additional mass flow Z is supplied to the suction conduit 74 by way of an expansion member 54.

The intermediate pressure collector 44 provides the possibility of dividing the expansion mass flow E at the expansion pressure PE into a main mass flow H that is supplied to the cooling stage 62' by way of the liquid conduit, and a gaseous additional mass flow Z that is supplied to the suction-pressure conduit 74 by way of the expansion member 54.

Figure 6:
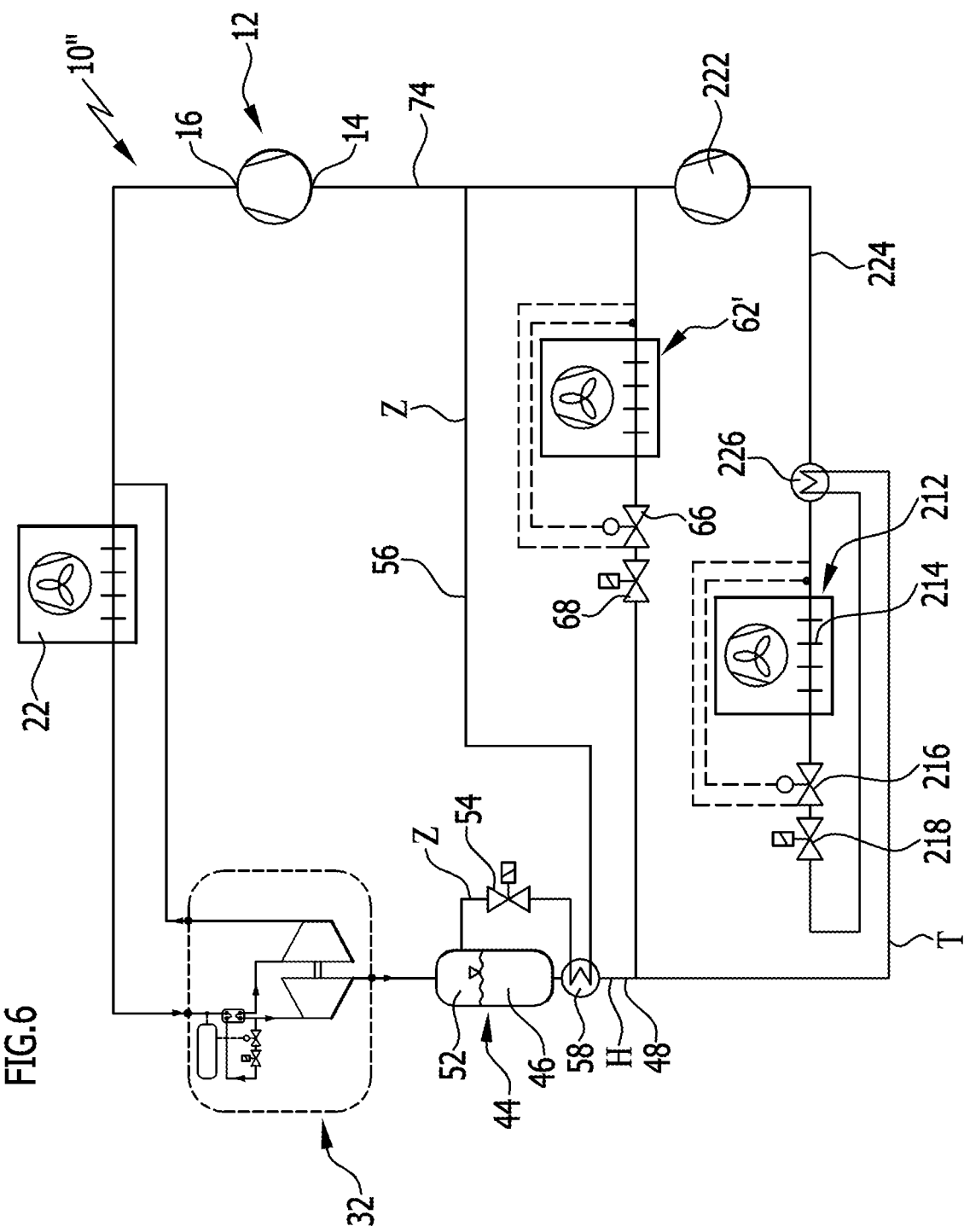
FIG. 6 shows a schematic illustration of a third exemplary embodiment of a refrigerant circuit according to the invention.

In a third exemplary embodiment of a refrigerant circuit 10" according to the invention, which is illustrated in FIG. 6, the elements that are identical to those of the first and second exemplary embodiments are provided with the same reference numerals, so for a description thereof the reader may refer to the entire content of the statements relating to the first and second exemplary embodiments.

In contrast to the second exemplary embodiment, the additional mass flow Z from the gas volume 52 is not supplied directly to the suction-pressure conduit 74 by way of the expansion member 54 but is further guided through an subcooler 58, which is provided in the liquid conduit 48 and further subcools the main mass flow H flowing in the liquid conduit 48.

In addition, the cooling stage 62' takes the form for example of a normal cooling stage, and a freezing stage 212 is additionally provided that has a heat-absorbing heat exchanger 214 and a switch-off member 218 and an expansion member 216.

The refrigerant that is expanded in the freezing stage 212 is supplied by way of a suction-pressure conduit 224 to a freezing compressor unit 222, which compresses the refrigerant again to such an extent that it can be supplied to the suction-pressure conduit 74 for the refrigerant compressor unit 12, for the purpose of high-pressure compression.

Moreover, in the suction-pressure conduit 224 of the freezing compressor unit 212 there is preferably also provided an subcooler 226 that, upstream of entry to the freezing stage 212, further subcools the refrigerant supplied to the freezing stage 212 by way of the liquid conduit 48, using the expanded refrigerant exiting from the freezing stage 212 and guided in the suction-pressure conduit 224.

Figure 7:
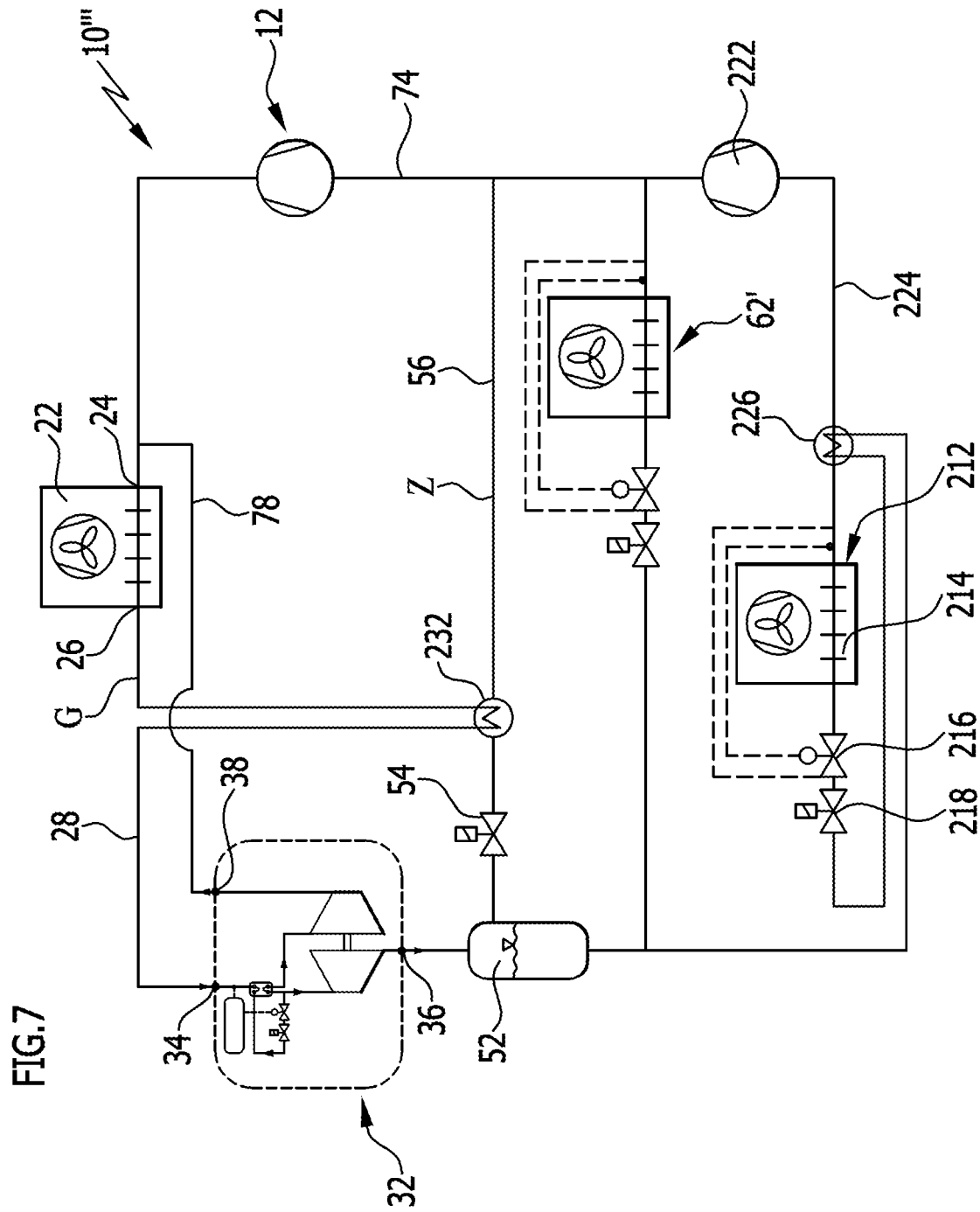
FIG. 7 shows a schematic illustration of a fourth exemplary embodiment of a refrigerant circuit according to the invention.

In a fourth exemplary embodiment of a refrigerant circuit 10''' according to the invention, which is illustrated in FIG. 7, the elements that are identical to those of the exemplary embodiments above, in particular those of the third exemplary embodiment, are provided with the same reference numerals, so for a description thereof the reader may refer to the entire content of the statements relating to the exemplary embodiments above.

In particular, in contrast to the third exemplary embodiment, in the fourth exemplary embodiment the additional mass flow Z exiting from the gas volume 52 and expanded by the expansion member 54 is guided through a heat exchanger 232 that additionally further subcools the total mass flow G, which exits from the heat-emitting heat exchanger 22, is guided in the high-pressure discharge conduit 28 and is likewise guided through this heat exchanger 232 before entering the expansion unit 32 by way of the high-pressure inlet connector 34.

In this way, the additional mass flow Z can also be utilised to additionally subcool the total mass flow G before entry thereof into the high-pressure inlet connector 34 of the expansion unit 32.

Figure 8:
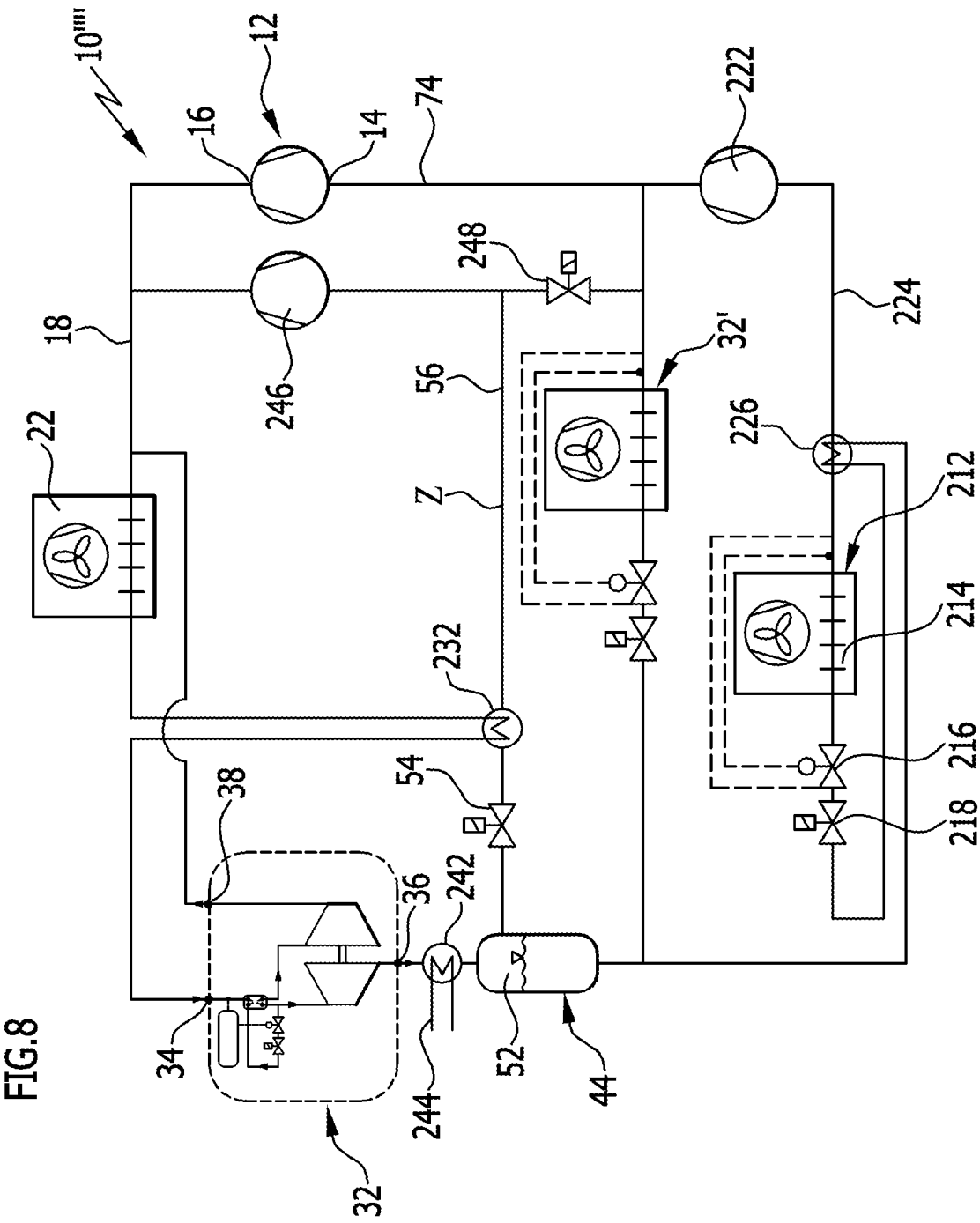
FIG. 8 shows a schematic illustration of a fifth exemplary embodiment of a refrigerant circuit according to the invention.

In a fifth exemplary embodiment of a refrigerant circuit 10'''' according to the invention, which is illustrated in FIG. 8, the elements that are identical to those of the exemplary embodiments above are likewise provided with the same reference numerals, so the reader may refer to the description thereof given in the context of the exemplary embodiments above, in particular the fourth exemplary embodiment.

In this fifth exemplary embodiment, there is further arranged between the expansion-pressure outlet connector 36 and the intermediate pressure collector 44 a heat exchanger 242 that serves to cool a refrigerant circuit of an air conditioning system 244.

In this case, it is preferably provided for the conduit 56 not to open into the suction conduit 74 of the refrigerant compressor unit 12 but to be connected to an additional compressor 246 that compresses to high pressure the additional mass flow that has been raised by the heat exchanger 242.

Further, the conduit 56 can also be connected to the suction-pressure conduit 74 by way of an expansion member 248.

In particular for cases where there is no need for operation of the additional compressor 246, the expansion member 248 that connects the conduit 56 to the suction-pressure conduit 74 of the refrigerant compressor unit 12 is provided.

In the exemplary embodiments described so far, only one expansion unit 32 has been used.

Because of the rigid functional coupling between the expander stage 86 and the compressor stage 88, each expansion unit 32 has a defined volume ratio of the expander stage to the compressor stage. This means that the volume that is compressed in the respective compressor stage 88 is strictly correlated with the volume expanded in the respective expander stage 86.

This strict correlation also makes it possible, by way of controlling the subcooling mass flow U, also to control the expansion mass flow E in proportion to the subcooling mass flow U, and thus there is no need for a pressure-reducing throttling member either between the heat-emitting heat exchanger 22 on the high-pressure side and the expansion stage 86, or in particular between the subcooling unit 102 and the expansion stage 86, in order to maintain the expansion mass flow E, which is primarily relevant to the pressure on the high-pressure side, in particular the pressure in the high-pressure discharge conduit 28, and in particular also the pressure at the high-pressure inlet connector 34.

Rather, the expansion mass flow E is controlled by way of the expansion member 122 acting on the subcooling mass flow U, which establishes the subcooling mass flow U, which in turn also establishes the expansion mass flow E, though this is by way of the rigid functional coupling between the compression stage 88 and the expansion stage 86.

However, in dependence on the high pressure PH2, in particular on the respective high-pressure level, a variation in the volume ratio of the expansion unit 32 is advantageous in order to keep the efficiency thereof optimum as far as possible.

However, a variation in the volume ratio is not achievable using the expansion/compression unit 84 used according to the invention.

Figure 9:
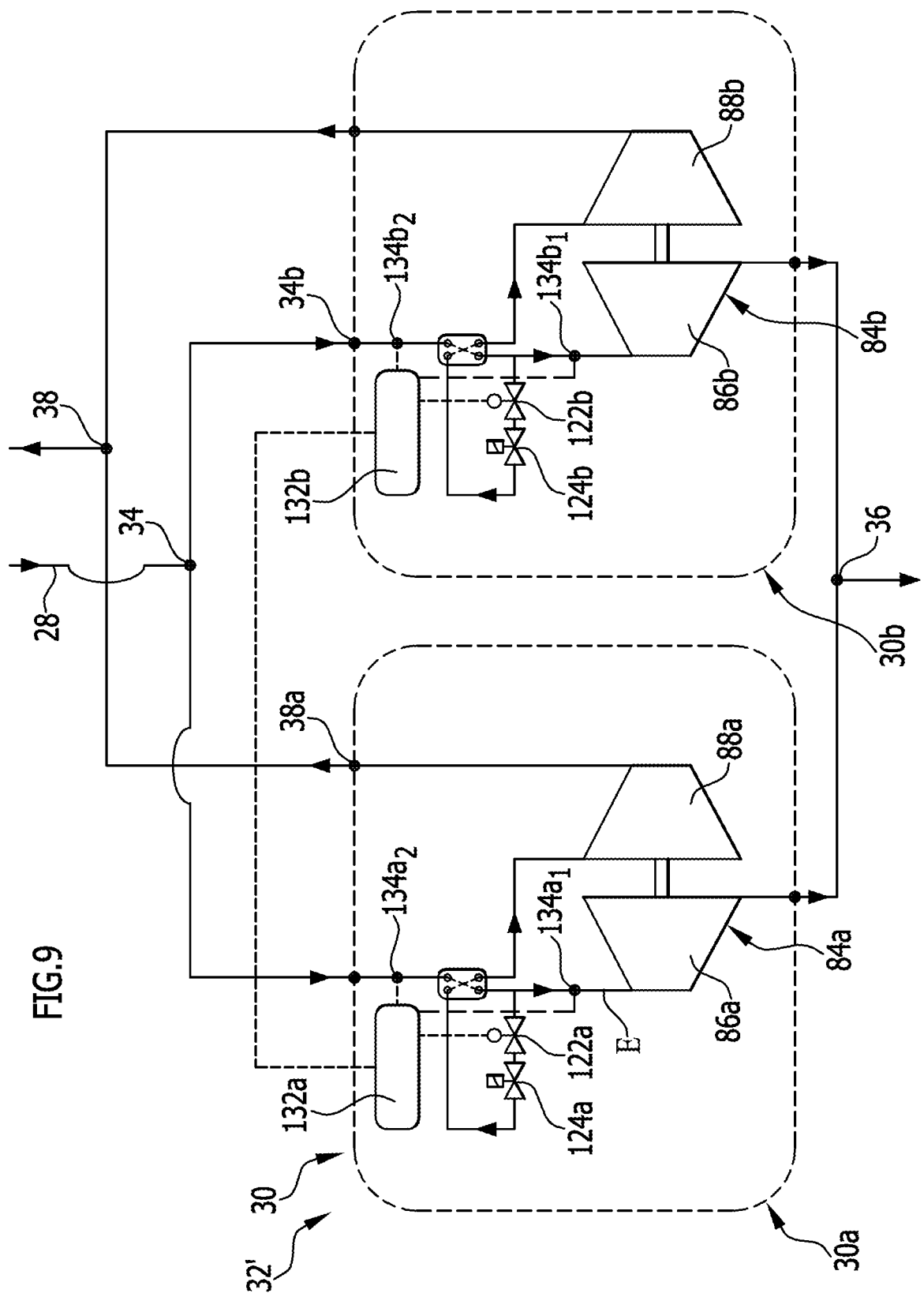
FIG. 9 shows a schematic illustration of a second exemplary embodiment of an expansion unit according to the invention.

For this reason, in a second exemplary embodiment of the expansion unit 32', which is illustrated in FIG. 9, it is provided for expansion systems 30a and 30b connected in parallel to be used.

For example, as regards its volume ratio, the first expansion system 30a is configured such that it is optimised for a high level of high pressure, while the volume ratio of the second expansion system 30b is optimised for a lower high-pressure level.

Figure 10:
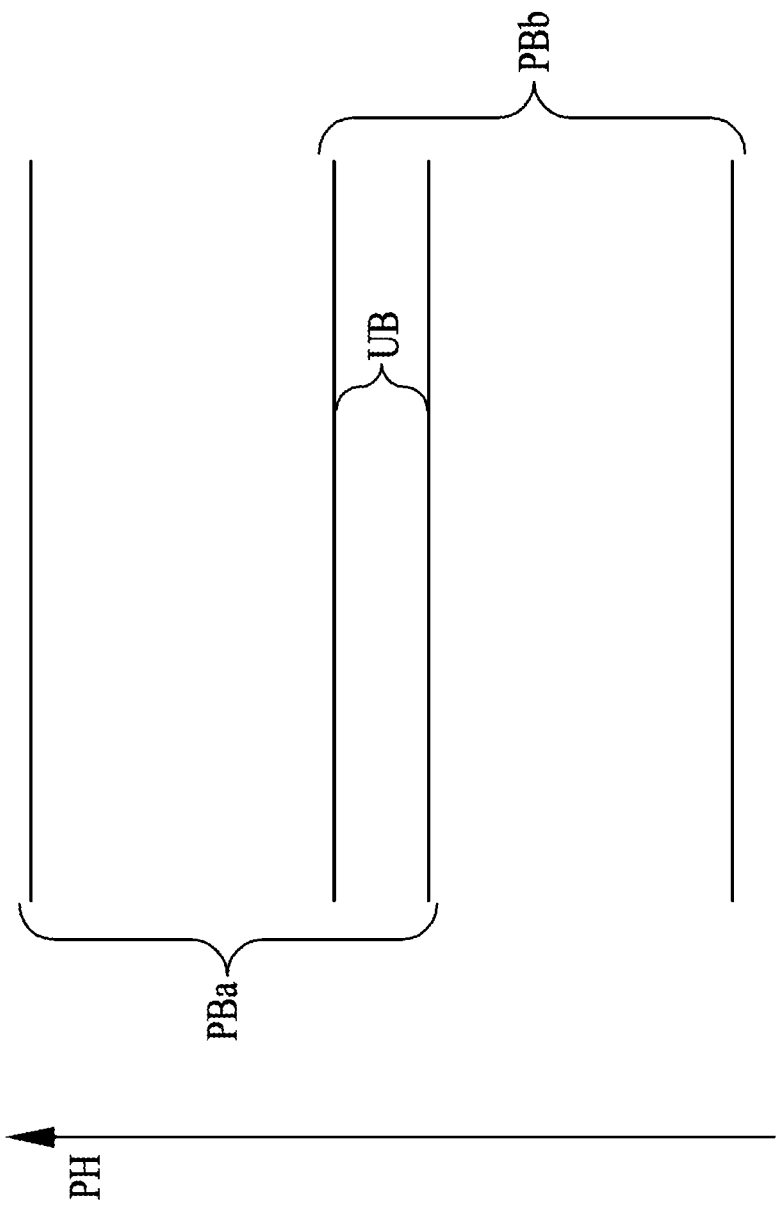
FIG. 10 shows a schematic illustration of different operating modes of the second exemplary embodiment of the expansion unit according to the invention.

In this case, however, the controllers 132 have to be coupled to one another, with the controller 132a for example being effective in a range with a high high-pressure level while the controller 132b is effective in a range with a low high-pressure level, wherein the two ranges adjoin one another or may even overlap, as illustrated for example in FIG. 10.

For example, the first expansion system 30a operates in a pressure range PBa and the second expansion system 30b operates in a pressure range PBb, wherein the pressure ranges PBa and PBb are selected for example such that they overlap, with the result that both expansion systems 30a and 30b are effective in an overlap region UB.

In this way, with this exemplary embodiment it is possible to perform expansion of the refrigerant by the expansion systems 30a and 30b as efficiently as possible, both at an upper high-pressure level—for example corresponding to a transcritical range—and also at a low high-pressure level—for example corresponding to a subcritical range.

Here, the volume ratio of the second expansion system 30b lies for example in the range between 0.7 times and 0.9 times the volume ratio of the first expansion system 30a, preferably in the range between 0.8 times and 0.9 times the volume ratio of the first expansion system 30a.

Figure 11:
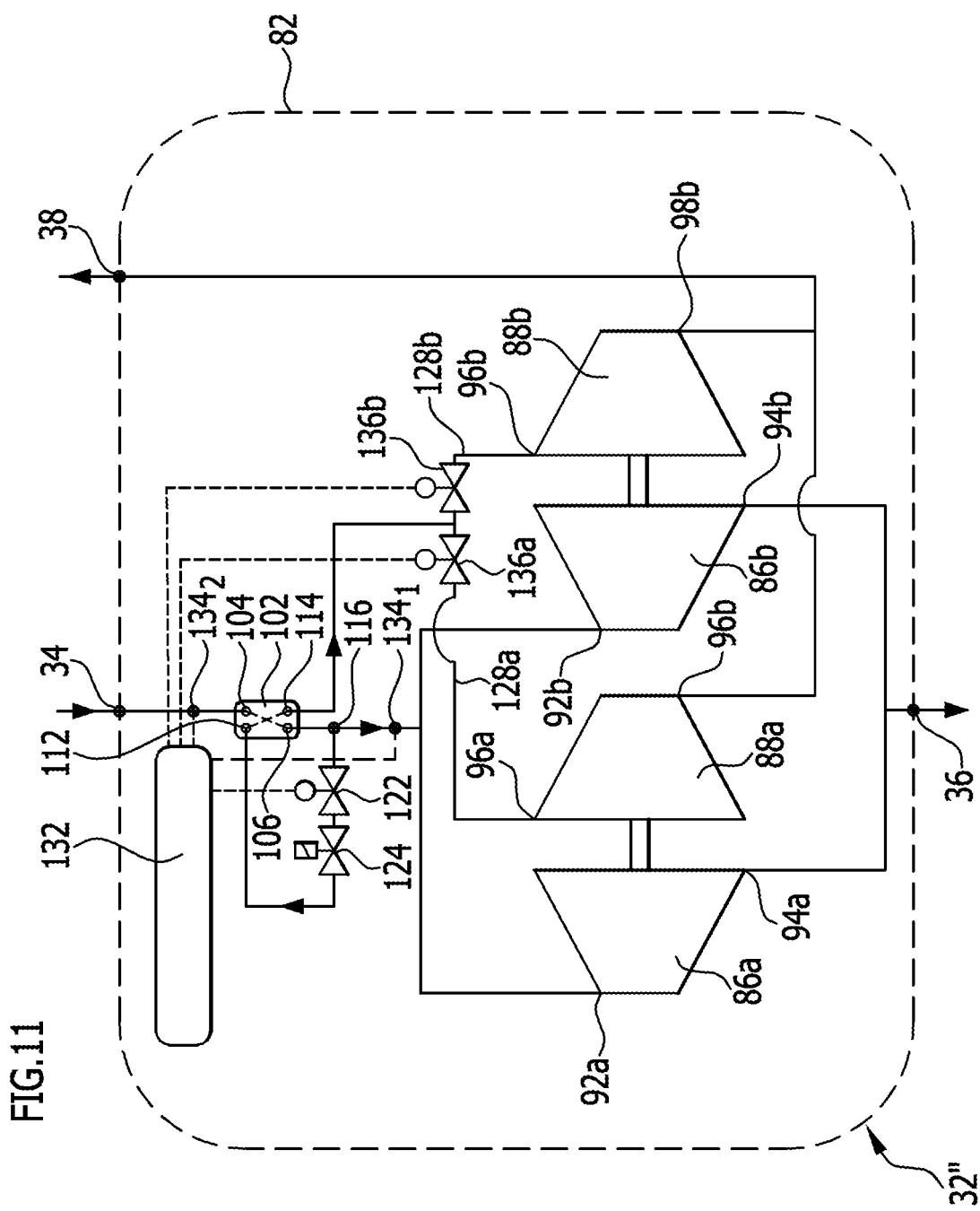
FIG. 11 shows a schematic illustration of a third exemplary embodiment of an expansion unit according to the invention.

In a third exemplary embodiment of an expansion unit 32" according to the invention, which is illustrated in FIG. 11, there are provided in the same expansion unit 32", on the same device base 82, two expansion/compression units 84a and 84b, in which the volume ratios between the expander stage 86a and 86b respectively and the compressor stage 88a and 88b respectively are of different sizes.

However, provided in the expansion unit 32" is only one subcooling unit 102, through which the total mass flow G passes, and the two expansion/compression units 84a and 84b are arranged in parallel between the branching point 116 and the expansion-pressure outlet connector 36.

In each of the branches 128a and 128b of the connection conduit 128 that lead to the compressor inlets 96a and 96b there is provided a shut-off member 136a and 136b respectively, which are controllable by the controller 132, with the result that the expansion/compression units 84a and 84b are controllable by way of the subcooling mass flow U that is supplied pro rata to the compressor stages 88a and 88b. For example, depending on the level of the high pressure PH2, the controller 132 may use either the first expansion/compression unit 84a, which is provided for a high high-pressure level, or the second expansion/compression unit 84b, which is provided for a low high-pressure level, or where appropriate it may use both expansion/compression units 84 pro rata for the purpose of expanding the expansion mass flow E and compressing the subcooling mass flow U.

Figure 12:
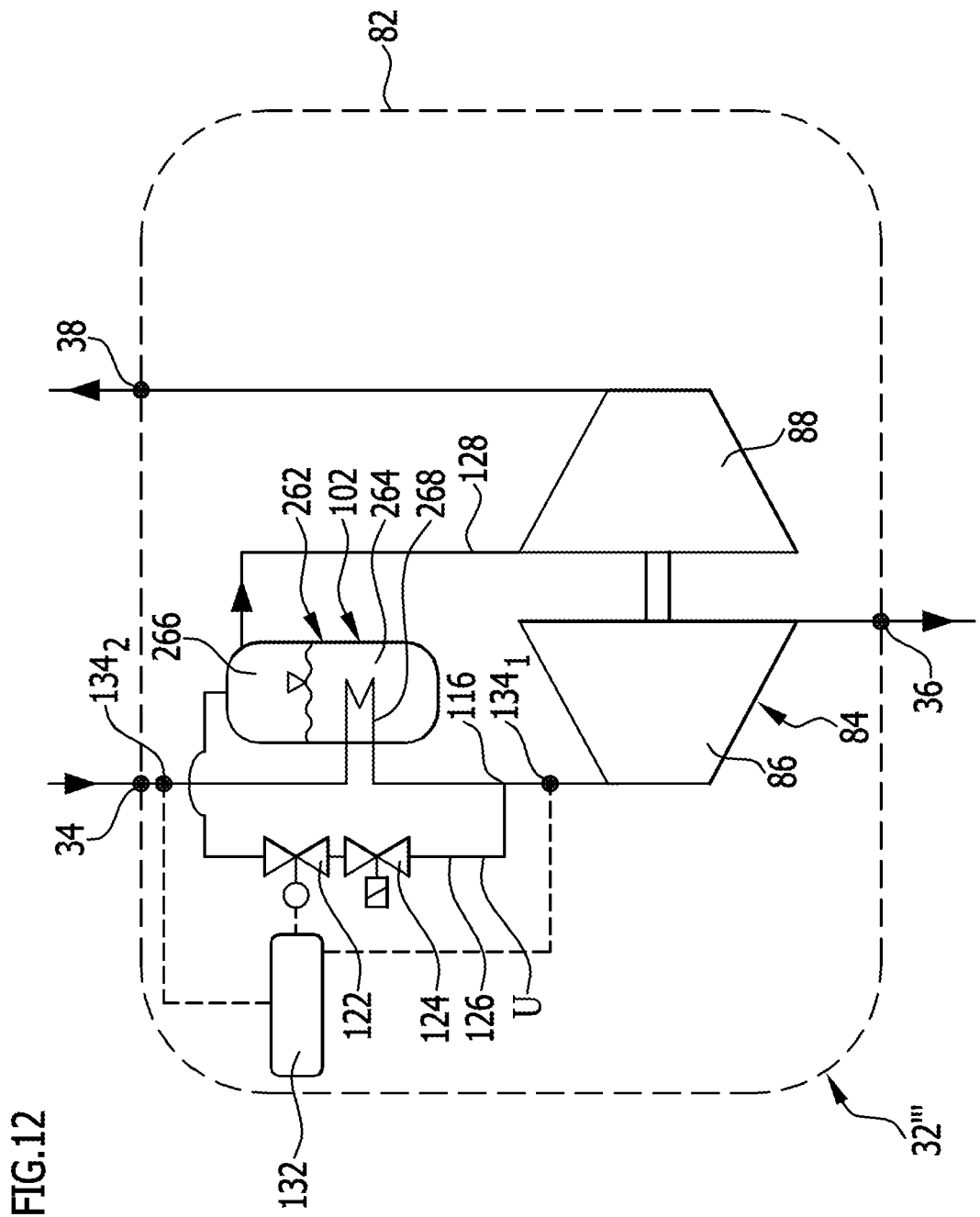
FIG. 12 shows a schematic illustration of a fourth exemplary embodiment of an expansion unit according to the invention.

In a fourth exemplary embodiment of an expansion unit 32''' according to the invention, which is illustrated in FIG. 12, the elements that are identical to those of the exemplary embodiments above are provided with the same reference numerals, so in this regard the reader is referred to the entire content of the statements relating to these exemplary embodiments.

In contrast to these exemplary embodiments, in the fourth exemplary embodiment the subcooling unit 102 takes the form of a collecting container 262, to which the subcooling mass flow U cooled by the expansion member 122 is supplied, and which forms a bath 264 of liquid refrigerant and a gas volume 266 above it, which is supplied to the compressor stage 88 by the connection conduit 128.

Extending within the liquid bath 264 is an element 268, in which the total mass flow G is guided and which subcools the total mass flow G before it flows to the branching point 116 and the expansion/compression unit 84, with the result that the total mass flow G is subcooled to the temperature of the liquid bath 264.

Preferably, the collecting container 262 is also provided with an oil separator and an oil return line.

Figure 13:
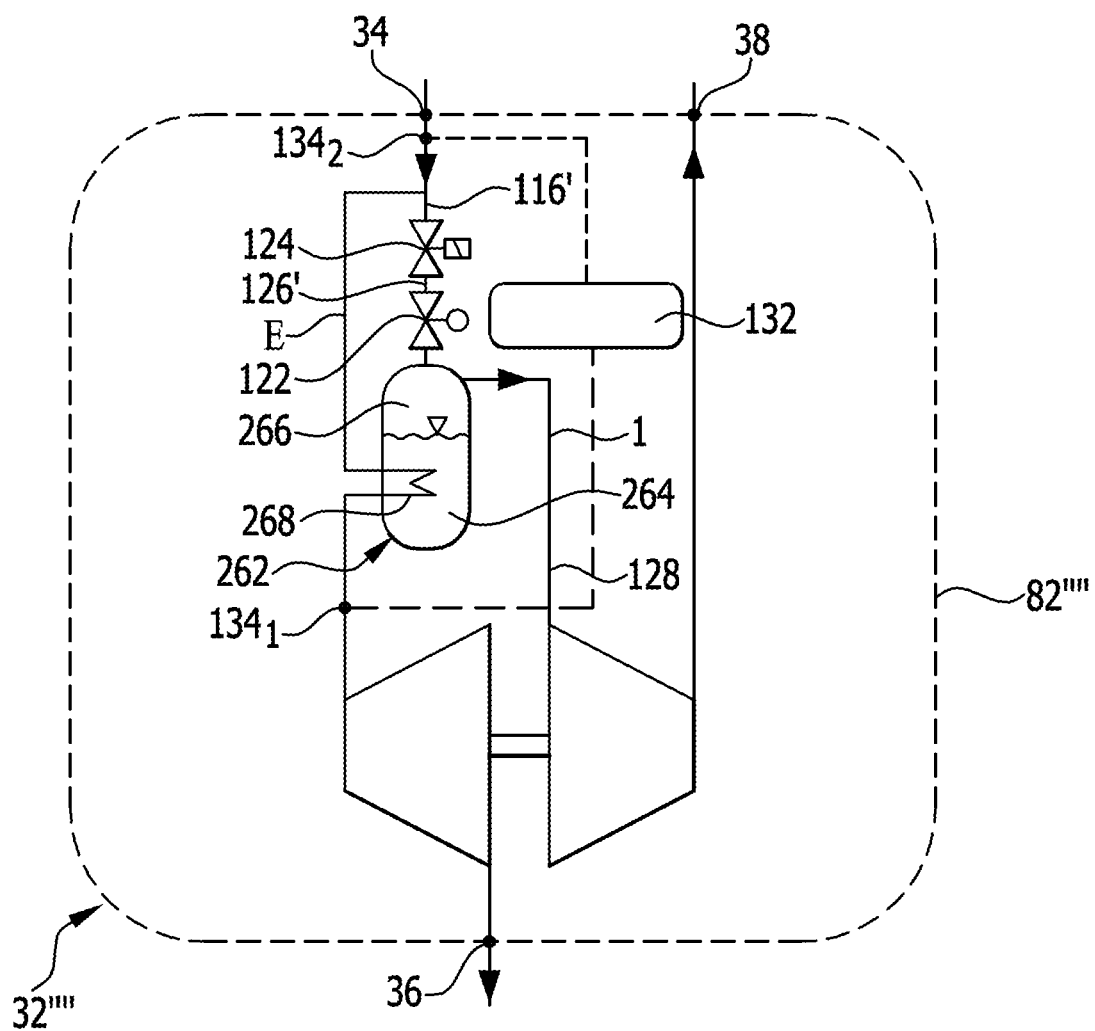
FIG. 13 shows a schematic illustration of a fifth exemplary embodiment of an expansion unit according to the invention.

In a fifth exemplary embodiment of an expansion unit 32'''' according to the invention, which is illustrated in FIG. 13, the elements that are identical to those of the exemplary embodiments above are likewise provided with the same reference numeral, so the reader is referred to the statements relating to the exemplary embodiments above.

In contrast to the fourth exemplary embodiment, the branching point 116' is located between the high-pressure inlet connector 34 and the collecting container 262, with the result that the subcooling mass flow U is already split away from the element 268, by way of the supply conduit 126' that leads from the branching point 116' to the collecting container 262 and has the expansion member 122, and as a result of the element 268 is not subject to any subcooling before the expansion.

In this exemplary embodiment, the temperature is measured using the sensor 134, for example upstream of the branching point 116'.

In a sixth exemplary embodiment of an expansion unit 32''''' according to the invention, the elements that are identical to those of the exemplary embodiments above are provided with the same reference numerals, so in this regard the reader may refer to the statements relating to the exemplary embodiments above.

Figure 14:
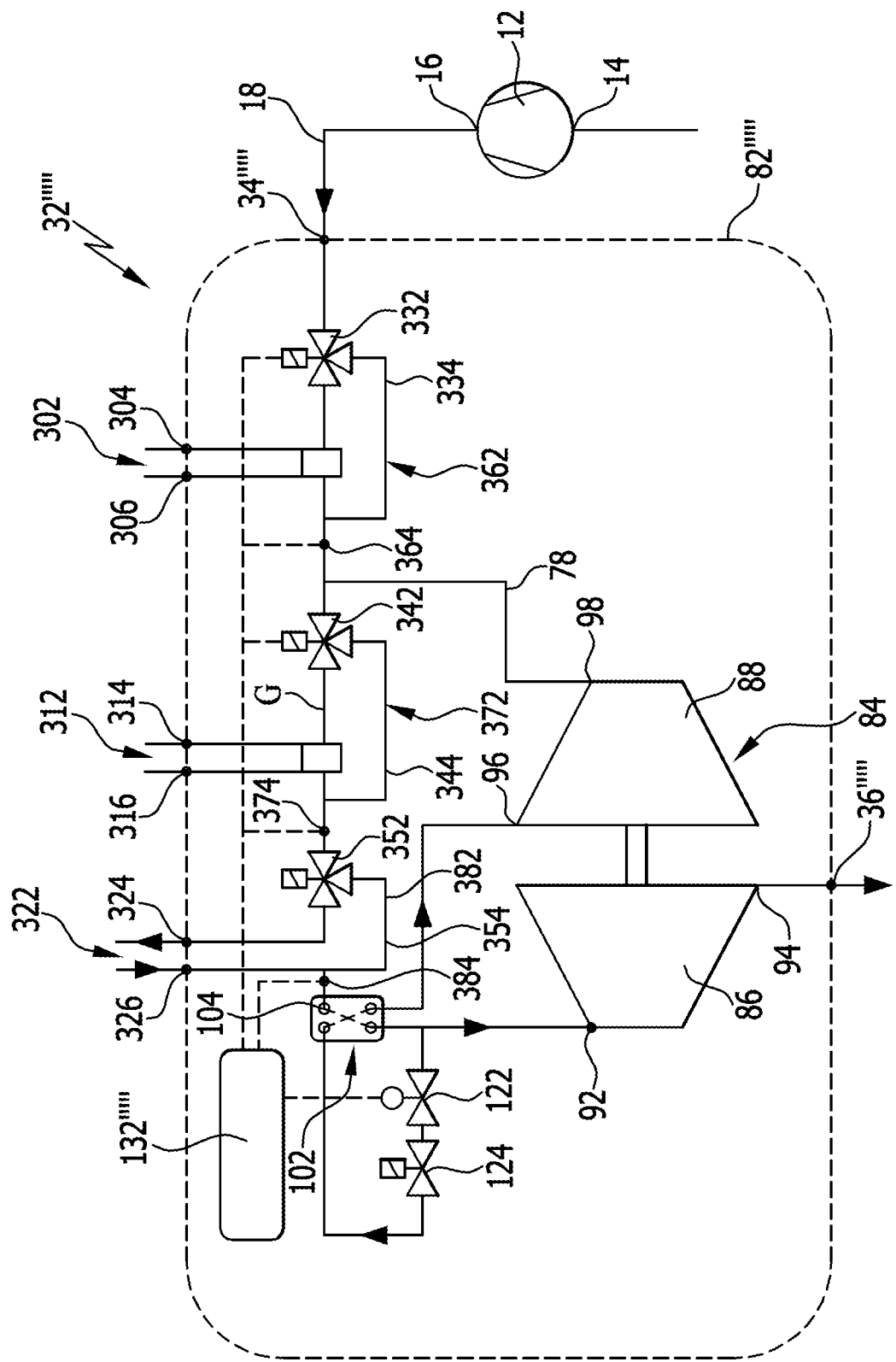
FIG. 14 shows a schematic illustration of a sixth exemplary embodiment of an expansion unit according to the invention.

In the sixth exemplary embodiment of an expansion unit 32''''', which is illustrated in FIG. 14, the high-pressure inlet connector 34''''' is directly connected to the high-pressure conduit 18 coming from the refrigerant compressor unit 12.

Further, between the high-pressure inlet connector 34''''' and the inlet 104 of the subcooling unit 102 on the device base there are provided a plurality of connector sets 302, 312 and 322, wherein each connector set 302, 312, 322 has an infeed connector 304, 314, 324 and a return connector 306, 316, 326, such that a respective heat exchanger (not illustrated in FIG. 14) is connectable to each of these connector sets 302, 312, 322.

Further, a respective three-way valve 332, 342, 352 and bypass 334, 344, 354 are also provided on the device base 82 for each of the connector sets 302, 312, 322, wherein the three-way valve 332, 342, 352 and the respective bypass 334, 344, 354 make it possible to bypass the respective connector set 302, 312, 322 internally within the expansion unit 32'''''.

Thus, with the respective three-way valve 332, 342, 352 there is the possibility of determining the proportion of compressor volumetric flow V that flows through the respective connector set 302, 312, 322 to the heat exchanger that is respectively connected to this connector set 302, 312, 322 and the proportion of compressor volumetric flow that flows through the respective bypass 334, 344, 354.

In the extreme case, the respective three-way valve 332, 342, 352 provides the possibility of allowing the entire compressor volumetric flow V to flow to the heat exchanger that is connected to the respective connector set 302, 312, 322, or through the respective bypass 334, 344, 354.

The respective connector set 302, 312, 322, the three-way valve 332, 342, 352 that is respectively associated therewith and the bypass 334, 344, 354 that is associated with the respective connector set 302, 312, 322 in each case together form a heat exchanger connector element 362, 372 and 382 respectively, wherein the heat exchanger connector units 362, 372, 382 are arranged in series one after the other, with the result that, for example starting from the high-pressure inlet connector 34''''', flow is first through the heat exchanger connector unit 362, then through the heat exchanger connector unit 372 and then through the heat exchanger connector unit 382.

Further, on the outlet side of the respective heat exchanger connector unit 362, 372, 382 there are arranged in each case sensors 364, 374 and 384 that are connected to the controller 132''''' such that the controller 132''''' is for example able to measure the respective temperature of the compressor mass flow V on the outlet side of the heat exchanger connector units 362, 372 and 382 and, by correspondingly controlling the three-way valve 332, 342, 352, to control the extent to which flow is to be through the respective heat exchanger connected to the connector set 302, 312, 322 or not.

The heat-emitting heat exchanger 22 on the high-pressure side may be connected to each of the connector sets 302, 312, 322. Preferably, however, the heat-emitting heat exchanger 22 on the high-pressure side is connected to the connector set 322 and is thus located directly upstream of the inlet 104 to the subcooling unit 102, wherein the sensor 384 associated therewith preferably detects the temperature at the inlet 104 of the subcooling unit 102.

Further, the compressor outlet 98 of the expansion/compression unit 84 is preferably connected by way of the high-pressure return conduit 78, which in this exemplary embodiment is arranged on the device base 82, to an inlet of one of the heat exchanger connector units 362, 372 or 382, with the result that the subcooling mass flow U likewise passes through the heat exchanger connector units arranged downstream, in the case illustrated the heat exchanger connector units 372, 382, and this subcooling mass flow U is added to the compressor mass flow V and forms the total mass flow G.

The sixth exemplary embodiment of the expansion unit 32 according to the invention thus provides the possibility of supplying the heat in the compressor mass flow V and the subcooling mass flow U, controlled by the controller 132'''''' provided in this expansion unit 32'''''', optimally to a plurality of heat-emitting heat exchangers that operate for example at different temperature levels, including the heat-emitting heat exchanger 22, and thus of reducing the temperature at the inlet 104 of the subcooling unit 102 and hence also operating the expansion unit 32'''''' in the optimum manner at the same time as a result of controlling the subcooling mass flow U.

Figure 15:
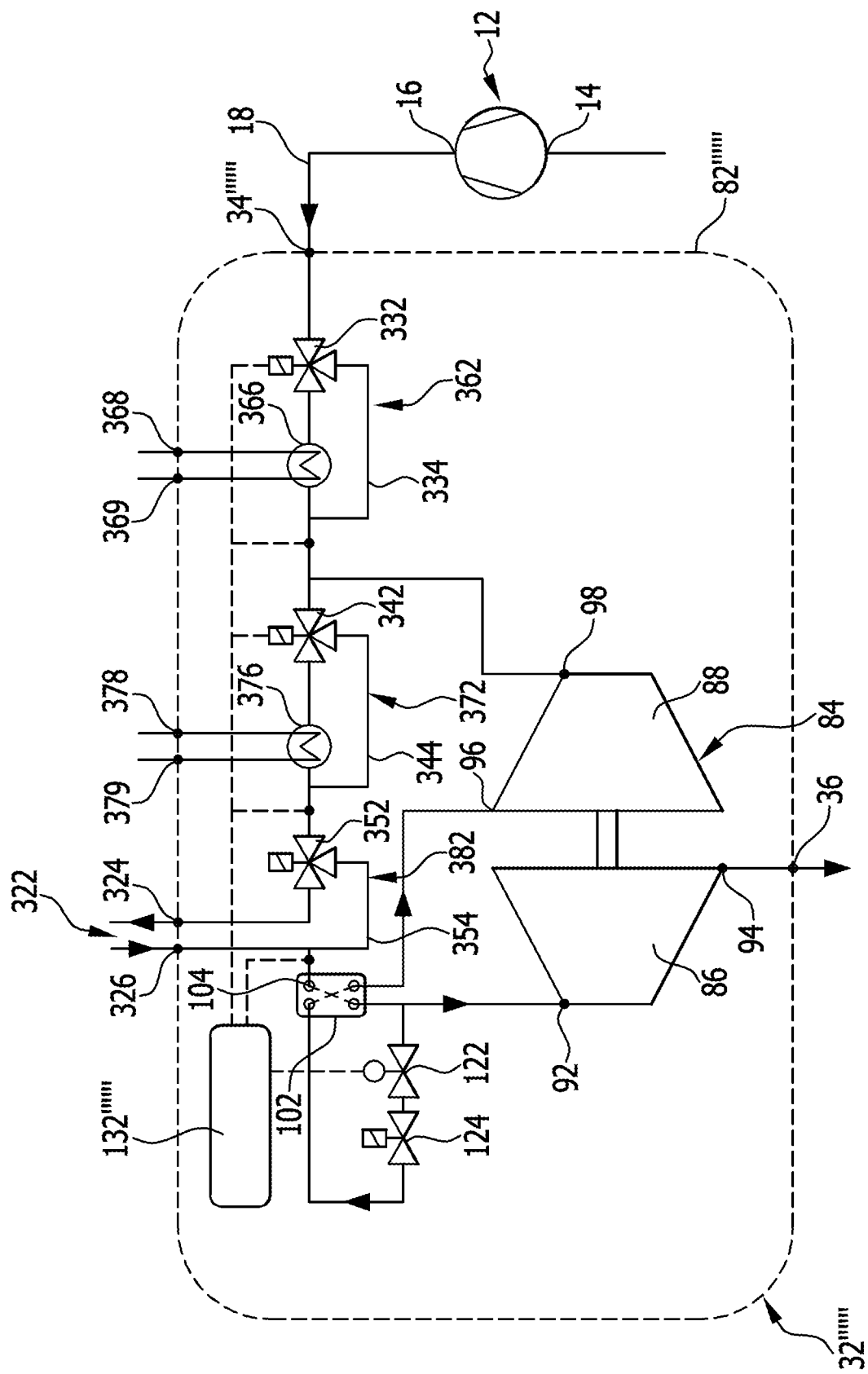
FIG. 15 shows a schematic illustration of a seventh exemplary embodiment of an expansion unit according to the invention.

In a seventh exemplary embodiment of an expansion unit according to the invention, which is illustrated in FIG. 15, the elements that are identical to those of the exemplary embodiments above are provided with the same reference numerals, so for a description thereof the reader may refer to the entire content of the statements relating to the exemplary embodiments above.

In contrast to the sixth exemplary embodiment, in the expansion unit 32'''''''' the heat exchanger connector units 362 and 372 take a form such that the heat exchangers 366 and 376 associated therewith are arranged directly on the device base 82'''''''' and thus the three-way valves 332 and 342 directly control flow through the heat exchangers 366, 376, with the result that there are provided as the external connectors on the device base 82 for the heat exchanger 366 an infeed connector 368 and a discharge connector 369, and for the heat exchanger 376 an infeed connector 378 and an outlet connector 379.

Otherwise, in the same way the controller 132'''''''' optimises the high pressure PH2 in accordance with the temperature of the total mass flow G that enters the inlet 104 of the subcooling unit 102.

The expansion units 32', 32'', 32''', 32'''', 32''''' and 32'''''' may be used in the same way in the exemplary embodiments of refrigerant circuits described above as the first exemplary embodiment of the expansion unit 32.

The invention claimed is:

1. An expansion unit for installation in a refrigerant circuit, including an expansion system having a subcooler for subcooling a mass flow of a refrigerant that is supplied to the expansion unit, having an expansion/compression unit including an expander stage and a compressor stage, having a branching point which branching point splits off a subcooling mass flow from a total mass flow supplied to the expansion unit and which branching point is connected to a supply conduit that guides the subcooling mass flow to an inlet of the subcooler, having an expander that is provided in the supply conduit and that expands the subcooling mass flow to a subcooling pressure, having a connection conduit that supplies the subcooling mass flow exiting from the subcooler to the compression stage, which for its part compresses the subcooling mass flow to a return high pressure that corresponds at least to a high pressure of a compressor mass flow to which the subcooling mass flow is supplied, and having an electrically operated controller that detects either or both of: (a) an ambient temperature or (b) a temperature of the mass flow of refrigerant that is supplied to either or both of (a) the expansion unit or (b) the expander stage, and in accordance with this temperature adjusts either or both of: (a) an inlet pressure of the expansion unit or (b) the expansion/compression unit by controlling the subcooling mass flow using the expander that is electrically controlled by the controller.

2. The expansion unit according to claim 1, wherein the branching point is arranged between the subcooler and the expansion/compression unit and splits off the subcooling mass flow from the total mass flow downstream of the subcooler.

3. The expansion unit according to claim 1, wherein the subcooler takes the form of a heat exchanger unit and cools the mass flow of refrigerant flowing to the expander stage using the subcooling mass flow U guided through the latter in counterflow.

4. The expansion unit according to claim 1, wherein the subcooler takes the form of a collecting container in which a bath of liquid refrigerant of the subcooling mass flow is formed that cools an element that guides the mass flow of refrigerant flowing to the expander stage through the bath, wherein a volume of gas forms above the bath and the gaseous subcooling mass flow is removed therefrom.

5. The expansion unit according to claim 1, wherein the controller uses a sensor to measure the ambient temperature or the temperature of the mass flow of refrigerant upstream of an inlet to the subcooler or upstream of an expander input.

6. The expansion unit according to claim 1, wherein the controller is an electronic controller that includes a processor and electrically controls the expander using a control program.

7. The expansion unit according to claim 1, wherein the expander stage (86) and the compressor stage of the expansion/compression unit are coupled in a mechanically functional manner.

8. The expansion unit according to claim 1, wherein the expander stage and the compressor stage are formed by a free-piston machine in which at least one free piston is freely movable in a piston chamber.

9. The expansion unit according to claim 8, wherein the expansion/compression unit has two piston chambers in each of which a free piston is movable.

10. The expansion unit according to claim 8, wherein the at least one free piston comprises a plurality of free pistons, the free pistons are movable coupled to one another.

11. The expansion unit according to claim 8, wherein a first free piston in a first piston chamber separates a first expansion chamber and a first compression chamber from one another.

12. The expansion unit according to claim 8, wherein a second free piston in a second piston chamber separates a second expansion chamber from a second compression chamber.

13. The expansion unit according to claim 8, wherein two free pistons are arranged and movable coaxially with one another in the piston chambers.

14. The expansion unit according to claim 12, wherein the first piston chamber is separated from the second piston chamber by a separating body.

15. The expansion unit according to claim 14, wherein two expansion chambers are arranged in the piston chambers adjacent to the separating body.

16. The expansion unit according to claim 15, wherein two compression chambers are arranged on the opposite sides of respective free pistons to the two expansion chambers.

17. The expansion unit according to claim 10, wherein a coupler that couples the free pistons extends through the separating body and is movable relative thereto.

18. The expansion unit according to claim 17, wherein the coupler extends through respective expansion chambers for the free pistons and as far as the free pistons.

19. The expansion unit according to claim 15, wherein the incoming flow of refrigerant to the respective expansion chambers is controllable by a slider system.

20. The expansion unit according to claim 19, wherein the slider system is controllable by a slider drive.

21. The expansion unit according to claim 20, wherein the slider drive is controlled by an electrical controller that detects at least one position of the free pistons using at least one position sensor that is associated with these free pistons.

22. The expansion unit according to claim 8, wherein the slider drive is controllable by the difference in pressure between an expander inlet and an expander outlet.

23. The expansion unit according to claim 22, wherein the slider drive takes the form of a double-acting actuating cylinder the piston of which is acted upon on one side by the pressure at the expander inlet and on the other by the pressure at the expander outlet.

24. The expansion unit according to claim 23, wherein the slider drive is controllable by a control slider that controls the action on the piston by the pressure on one side at the expander inlet and on the other at the expander outlet.

25. The expansion unit according to claim 24, wherein the control slider detects the positions of the piston.

26. The expansion unit according to claim 25, wherein the control slider is movable by the piston.

27. The expansion unit according to claim 1, wherein the expansion unit has a device base on which the subcooler and the expansion/compression unit are arranged.

28. The expansion unit according to claim 27, wherein the controller is arranged on the device base.

29. The expansion unit according to claim 27, wherein a high-pressure inlet connector and an expansion-pressure outlet connector are arranged on the device base.

30. The expansion unit according to claim 27, wherein a high-pressure outlet connector is arranged on the device base.

31. The expansion unit according to claim 27, wherein heat exchanger connector units are provided on the device base.

32. The expansion unit according to claim 31, wherein each of the heat exchanger connector units has a respective three-way valve and a respective bypass for the respective heat exchanger.

33. The expansion unit according to claim 31, wherein at least one of the heat exchanger connector units is connected to a heat exchanger on the high-pressure side that emits heat to the ambient air.

34. The expansion unit according to claim 1, wherein the expansion unit has an expansion system having a first volume ratio defined by the quotient of the volume of the compression chambers to the volume of the expansion chambers, in that there is connected in parallel with the first expansion system a second expansion system the volume ratio of which is smaller than that of the first expansion system.

35. The expansion unit according to claim 34, wherein the expansion systems are operated such that one of the expansion systems operates in the transcritical range and the other expansion system operates in the subcritical range.

36. The expansion unit according to claim 35, wherein the expansion system having the larger volume ratio operates in the transcritical range and the expansion system having the smaller volume ratio operates in the subcritical range.

37. The expansion unit according to claim 34, wherein the controllers of the expansion systems are coupled to one another.

38. The expansion unit according to claim 1, wherein the expansion unit includes two expansion/compression units, of which one has a first volume ratio defined by the quotient of the volume of the compression chambers to the volume of the expansion chambers and the other has a second volume ratio that differs from the first volume ratio.

39. The expansion unit according to claim 38, wherein the volume ratio of the first expansion/compression unit is larger than the volume ratio of the second expansion/compression unit.

40. The expansion unit according to claim 39, wherein the first expansion/compression unit operates in the transcritical range and the second expansion/compression unit operates in the subcritical range.

41. The expansion unit according to claim 39, wherein the controller controls a use of the respective expansion/compression units.

42. The expansion unit according to claim 41, wherein the controller uses the respective subcooling mass flows to control division of the expansion mass flow into the partial mass flows that flow to the expander stages.

43. A refrigerant circuit, including a refrigerant compressor unit, a heat exchanger that emits heat and is arranged in the refrigerant circuit on the pressure side of the refrigerant compressor unit, the expansion unit and a cooling stage having at least one heat-absorbing heat exchanger, wherein the expansion unit takes a form according to claim 1.

44. The refrigerant circuit according to claim 43, wherein there is arranged downstream of the cooling stage a phase separator, the gas phase of which is supplied to the refrigerant compressor by a suction-pressure conduit.

45. The refrigerant circuit according to claim 43, wherein the cooling stage has at least one expander.

46. The refrigerant circuit according to claim 43, wherein there is arranged between the expansion unit and the cooling stage an intermediate pressure collector, in the bath of which a liquid phase of the refrigerant collects, and in the gas volume of which above the bath a gas phase of the refrigerant collects.

47. The refrigerant circuit according to claim 46, wherein an additional mass flow is removed from the gas volume of the intermediate pressure collector.

48. The refrigerant circuit according to claim 47, wherein the additional mass flow is supplied to the suction-pressure conduit by way of an expander.

49. The refrigerant circuit according to claim 48, wherein the additional mass flow that is expanded by the expander cools a main mass flow, which is guided to the cooling stage, in a heat exchanger.

50. The refrigerant circuit according to claim 43, wherein a freezing stage is connected in parallel with the cooling stage.

51. The refrigerant circuit according to claim 50, wherein a freezing mass flow that is supplied to the freezing stage is cooled before expansion in an expander associated with the freezing stage, by the mass flow that is expanded in the freezing stage, using a heat exchanger.

52. The refrigerant circuit according to claim 43, wherein the total mass flow that is cooled by the heat-emitting heat exchanger is cooled by the additional mass flow that is expanded by the expander, using a heat exchanger.

53. The refrigerant circuit according to claim 43, wherein there is arranged downstream of the expansion unit a heat exchanger in which a heat exchanger medium of a refrigeration system is cooled by the expansion mass flow.

54. The expansion unit of claim 1, wherein the expander is a valve.

55. The expansion unit of claim 54, further comprising a servo-motor operably connected to the valve for driving the valve.

\* \* \* \* \*